(12) United States Patent
Miklos et al.

(10) Patent No.: US 12,074,833 B2
(45) Date of Patent: *Aug. 27, 2024

(54) METHODS AND APPARATUS FOR DETERMINING NON-TEXTUAL REPLY CONTENT FOR INCLUSION IN A REPLY TO AN ELECTRONIC COMMUNICATION

(71) Applicant: GOOGLE LLC, Mountain View, CA (US)

(72) Inventors: Balint Miklos, Zurich (CH); Ijeoma Emeagwali, San Francisco, CA (US); Phillip Sharp, Sunnyvale, CA (US); Prabhakar Raghavan, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,206

(22) Filed: Feb. 6, 2023

(65) Prior Publication Data
US 2023/0188489 A1 Jun. 15, 2023

Related U.S. Application Data

(63) Continuation of application No. 17/148,265, filed on Jan. 13, 2021, now Pat. No. 11,575,628, which is a
(Continued)

(51) Int. Cl.
*H04L 51/08* (2022.01)
*G06F 16/00* (2019.01)
(Continued)

(52) U.S. Cl.
CPC ............ *H04L 51/08* (2013.01); *G06F 16/00* (2019.01); *G06F 16/903* (2019.01);
(Continued)

(58) Field of Classification Search
CPC ....... H04L 51/08; H04L 51/02; G06F 16/903; G06F 16/00; G06F 40/279;
(Continued)

(56) References Cited

U.S. PATENT DOCUMENTS

| | | | |
|---|---|---|---|
| 5,774,867 | A | 6/1998 | Fitzpatrick et al. |
| 6,782,393 | B1 * | 8/2004 | Balabanovic .......... G06F 16/93 |

(Continued)

FOREIGN PATENT DOCUMENTS

| | | |
|---|---|---|
| CN | 101034398 | 9/2007 |
| CN | 103080980 | 5/2013 |

(Continued)

OTHER PUBLICATIONS

China National Intellectual Property Administration; Notification of Grant issued in Application No. 202010661978.8; 4 pages; dated Jul. 4, 2022.

(Continued)

*Primary Examiner* — James N Fiorillo
(74) *Attorney, Agent, or Firm* — Gray Ice Higdon

(57) ABSTRACT

Methods and apparatus related to determining non-textual reply content for a reply to an electronic communication and providing the non-textual reply content for inclusion in the reply. Some of those implementations are directed to determining, based on an electronic communication sent to a user, one or more electronic documents that are responsive to the electronic communication, and providing one or more of those electronic documents for inclusion in a reply by the user to the electronic communication. For example, the electronic documents may be automatically attached to the reply and/or link(s) to the electronic documents automatically provided in the reply.

20 Claims, 12 Drawing Sheets

Related U.S. Application Data continuation of application No. 16/584,178, filed on Sep. 26, 2019, now Pat. No. 10,917,371, which is a continuation of application No. 15/994,789, filed on May 31, 2018, now Pat. No. 10,454,861, which is a continuation of application No. 14/986,643, filed on Jan. 1, 2016, now Pat. No. 10,021,051.

(51) Int. Cl.
*G06F 16/903* (2019.01)
*G06F 40/279* (2020.01)
*G06N 20/00* (2019.01)
*G06Q 10/107* (2023.01)
*H04L 51/02* (2022.01)

(52) U.S. Cl.
CPC ........... *G06F 40/279* (2020.01); *G06N 20/00* (2019.01); *G06Q 10/107* (2013.01); *H04L 51/02* (2013.01)

(58) Field of Classification Search
CPC ........ G06F 17/30663; G06F 17/30684; G06Q 10/107; G06N 20/00; G09B 7/02
USPC .......................................................... 709/206
See application file for complete search history.

(56) References Cited

U.S. PATENT DOCUMENTS

| | | | |
|---|---|---|---|
| 7,383,257 B2 | 6/2008 | Cody et al. | |
| 7,444,328 B2 * | 10/2008 | Starbuck | G06Q 10/107 707/999.005 |
| 8,056,128 B1 | 11/2011 | Dingle et al. | |
| 8,438,074 B2 | 5/2013 | Serbanescu | |
| 8,510,328 B1 | 8/2013 | Hatton | |
| 8,660,849 B2 * | 2/2014 | Gruber | G10L 15/183 340/988 |
| 8,719,256 B2 | 5/2014 | Jones et al. | |
| 8,868,667 B2 | 10/2014 | Gorecha et al. | |
| 8,903,929 B2 | 12/2014 | Caldwell et al. | |
| 9,092,529 B1 | 7/2015 | Gyongyi et al. | |
| 9,313,806 B2 | 4/2016 | Zakrzewski | |
| 9,317,591 B2 | 4/2016 | Xie et al. | |
| 9,323,836 B2 | 4/2016 | Freeman et al. | |
| 9,424,317 B2 | 8/2016 | Hu | |
| 9,483,452 B2 | 11/2016 | Blanchard et al. | |
| 9,659,056 B1 | 5/2017 | Chechik et al. | |
| 9,842,166 B1 | 12/2017 | Leviathan et al. | |
| 9,875,740 B1 | 1/2018 | Kumar et al. | |
| 9,911,134 B2 | 3/2018 | Gupta et al. | |
| 10,021,051 B2 | 7/2018 | Miklos et al. | |
| 10,042,940 B2 | 8/2018 | Agarwal et al. | |
| 10,140,295 B2 | 11/2018 | Ryger et al. | |
| 10,198,513 B2 | 2/2019 | Denninghoff | |
| 10,467,252 B1 | 11/2019 | Barsony et al. | |
| 10,496,705 B1 | 12/2019 | Irani et al. | |
| 10,540,381 B1 | 1/2020 | Rings et al. | |
| 10,917,371 B2 * | 2/2021 | Miklos | H04L 51/08 |
| 11,431,660 B1 * | 8/2022 | Leeds | G10L 15/22 |
| 11,435,887 B1 | 9/2022 | Mirho et al. | |
| 11,575,628 B2 * | 2/2023 | Miklos | G06F 40/279 |
| 2002/0139839 A1 | 10/2002 | Catan | |
| 2002/0139859 A1 | 10/2002 | Catan | |
| 2002/0143624 A1 | 10/2002 | Catan | |
| 2002/0143860 A1 | 10/2002 | Catan | |
| 2004/0194099 A1 | 9/2004 | Lamping et al. | |
| 2004/0254932 A1 | 12/2004 | Gupta et al. | |
| 2005/0021636 A1 | 1/2005 | Kumar | |
| 2005/0027695 A1 | 2/2005 | John et al. | |
| 2006/0149710 A1 * | 7/2006 | Koningstein | G06F 16/9536 |
| 2007/0033531 A1 | 2/2007 | Marsh | |
| 2007/0100946 A1 | 5/2007 | Kairis | |
| 2007/0192293 A1 | 8/2007 | Swen | |
| 2007/0208843 A1 | 9/2007 | Wexler et al. | |
| 2008/0189162 A1 | 8/2008 | Ganong et al. | |
| 2009/0005010 A1 | 1/2009 | Dote et al. | |
| 2009/0055392 A1 | 2/2009 | Gupta et al. | |
| 2009/0299853 A1 | 12/2009 | Jones et al. | |
| 2009/0300765 A1 * | 12/2009 | Moskovitch | G06F 21/562 726/24 |
| 2010/0082652 A1 | 4/2010 | Jones et al. | |
| 2011/0196864 A1 | 8/2011 | Mason et al. | |
| 2011/0252023 A1 * | 10/2011 | Santamaria | G06Q 10/107 715/752 |
| 2011/0275432 A1 | 11/2011 | Lutnick et al. | |
| 2011/0313852 A1 | 12/2011 | Kon et al. | |
| 2012/0089690 A1 | 4/2012 | Hein et al. | |
| 2012/0209853 A1 * | 8/2012 | Desai | G06F 16/3344 707/E17.014 |
| 2012/0245925 A1 | 9/2012 | Guha et al. | |
| 2012/0260351 A1 * | 10/2012 | Majeti | G06Q 10/107 726/28 |
| 2013/0031088 A1 * | 1/2013 | Srikrishna | G06F 16/3322 707/E17.014 |
| 2013/0275429 A1 | 10/2013 | York et al. | |
| 2013/0275528 A1 * | 10/2013 | Miner | G06Q 30/0201 709/206 |
| 2013/0304802 A1 | 11/2013 | Assadollahi | |
| 2014/0089953 A1 | 3/2014 | Chen et al. | |
| 2014/0164352 A1 | 6/2014 | Denninghoff | |
| 2014/0280267 A1 * | 9/2014 | Perlegos | G06F 16/43 707/758 |
| 2014/0358889 A1 | 12/2014 | Shmiel et al. | |
| 2015/0066653 A1 | 3/2015 | Mengle et al. | |
| 2015/0127565 A1 * | 5/2015 | Chevalier | G06Q 10/00 705/319 |
| 2015/0200885 A1 | 7/2015 | Sharp et al. | |
| 2015/0213372 A1 | 7/2015 | Shah et al. | |
| 2015/0339303 A1 * | 11/2015 | Perlegos | G06F 16/7867 707/756 |
| 2015/0356203 A1 | 12/2015 | Allen et al. | |
| 2015/0379554 A1 | 12/2015 | Copeland | |
| 2016/0117330 A1 | 4/2016 | Nash et al. | |
| 2016/0196265 A1 | 7/2016 | Allen et al. | |
| 2016/0277959 A1 | 9/2016 | Venkataraman et al. | |
| 2017/0123614 A1 * | 5/2017 | Perlegos | H04N 21/2187 |
| 2017/0124038 A1 * | 5/2017 | Upadhyay | G06F 40/166 |
| 2017/0124447 A1 * | 5/2017 | Chang | G06F 16/951 |
| 2017/0180285 A1 * | 6/2017 | Contractor | H04L 51/08 |
| 2017/0195269 A1 * | 7/2017 | Miklos | G06F 40/279 |
| 2017/0201471 A1 | 7/2017 | Miklos et al. | |
| 2017/0235848 A1 | 8/2017 | Van Dusen et al. | |
| 2017/0255594 A1 | 9/2017 | Hohnhold et al. | |
| 2017/0262529 A1 * | 9/2017 | Chim | G06F 16/3329 |
| 2017/0270159 A1 | 9/2017 | Wang et al. | |
| 2017/0323199 A1 | 11/2017 | Wu | |
| 2018/0113676 A1 | 4/2018 | De Sousa Webber | |
| 2018/0150551 A1 | 5/2018 | Wang et al. | |
| 2018/0278560 A1 | 9/2018 | Miklos et al. | |
| 2019/0007381 A1 | 1/2019 | Isaacson et al. | |
| 2019/0020687 A1 | 1/2019 | Noon et al. | |
| 2019/0124024 A1 | 4/2019 | Oberg et al. | |
| 2019/0139541 A1 | 5/2019 | Andersen et al. | |
| 2019/0205305 A1 | 7/2019 | Hopcroft et al. | |
| 2019/0220695 A1 | 7/2019 | Nefedov | |
| 2019/0286711 A1 * | 9/2019 | Terry | G06N 20/00 |
| 2019/0294727 A1 * | 9/2019 | Kohlmeier | G06F 16/3331 |
| 2019/0294728 A1 * | 9/2019 | Kohlmeier | G06F 16/93 |
| 2020/0020328 A1 | 1/2020 | Gordon et al. | |
| 2020/0034419 A1 | 1/2020 | Bondugula et al. | |
| 2020/0272791 A1 * | 8/2020 | Jonnalagadda | G06N 5/04 |
| 2020/0344183 A1 * | 10/2020 | Mummidi | G06N 20/00 |
| 2020/0401938 A1 | 12/2020 | Etkin et al. | |
| 2020/0410157 A1 | 12/2020 | van de Kerkhof et al. | |
| 2021/0073191 A1 * | 3/2021 | Hatami-Hanza | G06N 5/022 |
| 2021/0136015 A1 | 5/2021 | Miklos et al. | |
| 2021/0174427 A1 | 6/2021 | Isaacson et al. | |
| 2021/0295822 A1 | 9/2021 | Tomkins et al. | |
| 2022/0263877 A1 * | 8/2022 | Conlin | H04N 7/152 |
| 2022/0277282 A1 * | 9/2022 | Dorch | G06F 18/24 |
| 2022/0284071 A1 | 9/2022 | Denninghoff | |
| 2023/0007042 A1 * | 1/2023 | Haworth | H04L 63/205 |

(56) References Cited

U.S. PATENT DOCUMENTS

| | | | |
|---|---|---|---|
| 2023/0068342 A1* | 3/2023 | Matei | G06F 16/3346 |
| 2023/0188489 A1* | 6/2023 | Miklos | G06N 20/00 |
| | | | 709/206 |
| 2023/0206329 A1* | 6/2023 | Cella | G06Q 40/04 |
| | | | 705/37 |

FOREIGN PATENT DOCUMENTS

| | | |
|---|---|---|
| CN | 104991887 | 10/2015 |
| CN | 105007216 | 10/2015 |
| CN | 101989335 | 3/2019 |
| JP | 2006098993 | 4/2006 |
| WO | 2014082277 | 6/2014 |

OTHER PUBLICATIONS

European Patent Office; Preliminary Opinion issued in Application No. 16871775.9, 8 pages, dated May 16, 2022.

China National Intellectual Property Administration; Office Action issued for Application No. 202010661978.8; 33 pages; dated Dec. 30, 2021.

Zhang et al., "Why-Questions Answering for Reading Comprehension Based on Topic and Rhetorical Identification" Journal of Computer Research and Development, vol. 48, No. 2. pp. 216-223. dated Feb. 15, 2011.

European Patent Office; Summons to attend oral proceedings pursuant to Rule 115(1) EPC issued in Application No. 16871775.9; 8 pages; dated Dec. 13, 2021.

The Intellectual Property Office of the United Kingdom; Combined Search Report under Section 17 (5)(b) and Abbreviated Examination Report under Section 18(3) of Application No. GB1621603.8 dated May 18, 2017.

International Search Report and Written Opinion of PCT Ser. No. PCT/US2016/066688 dated Jul. 26, 2017.

China National Intellectual Property Administration; Office Action issued in Application No. 201611223830.6 dated Sep. 27, 2019.

European Patent Office: Office Action issued for Application No. 16871775.9 dated dated Jul. 13, 2020.

China National Intellectual Property Administration; Notice to Grant issued for Applicaiton No. 201611223830.6 dated Apr. 27, 2020.

\* cited by examiner

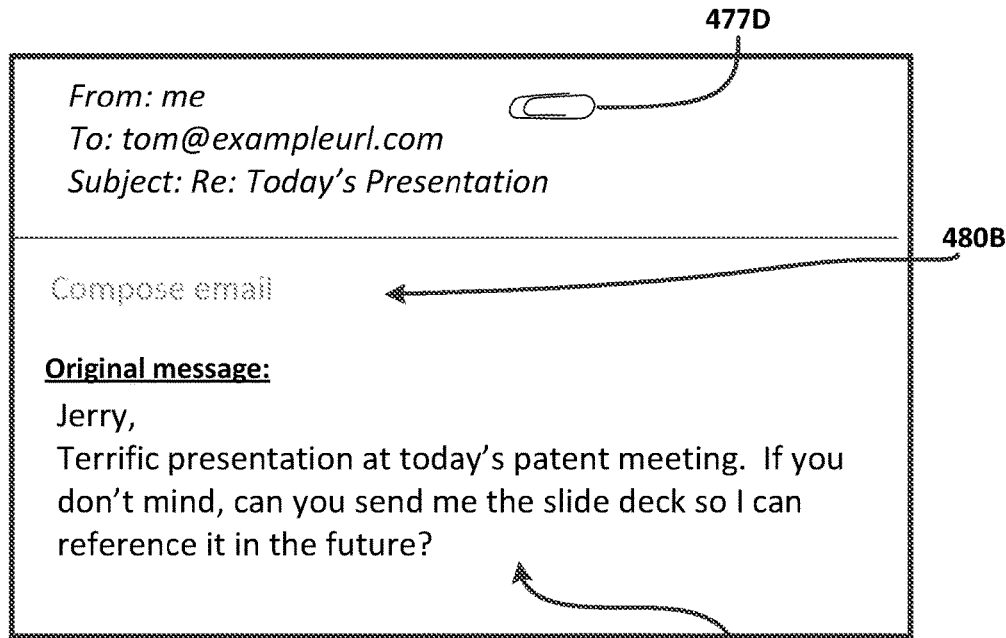
FIG. 4D1
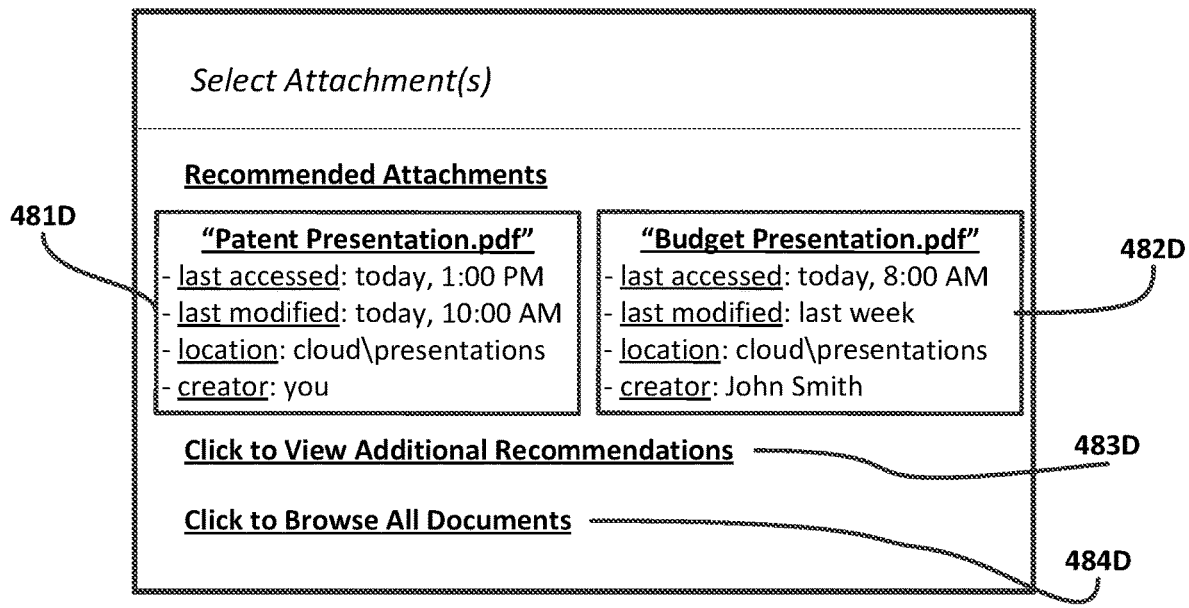
FIG. 4D2

METHODS AND APPARATUS FOR DETERMINING NON-TEXTUAL REPLY CONTENT FOR INCLUSION IN A REPLY TO AN ELECTRONIC COMMUNICATION

BACKGROUND

Users are often inundated with electronic communications such as emails, SMS communications, and social networking communications. Many electronic communications that are sent to a user explicitly solicit that the user reply with non-textual reply content or otherwise contain information to which the user may wish to reply with non-textual reply content. For example, an email that contains "Can you send me a copy of your slide deck from yesterday's meeting" may explicitly solicit a reply that includes non-textual reply content (i.e., an electronic document that is the slide deck). An email that contains "How is the home remodel progressing?" may not explicitly solicit a reply with non-textual reply content, but a user that receives the email may still wish to include non-textual reply content (e.g., a picture showing the current status of the home remodel) in a reply to the email. To include non-textual reply content in a reply, users must recognize that non-textual reply content is appropriate for the reply, manually browse for the non-textual reply content via a computing device of the user, and select the non-textual reply content via a user interface input device of the computing device to include the content in the reply.

SUMMARY

Some implementations of this specification are directed generally to methods and apparatus related to determining non-textual reply content for a reply to an electronic communication and providing the non-textual reply content for inclusion in the reply (e.g. automatically providing it in the reply or suggesting it for inclusion in the reply). Some of those implementations are directed to determining, based on an electronic communication sent to a user, one or more electronic documents that are responsive to the electronic communication, and providing one or more of those electronic documents for inclusion in a reply by the user to the electronic communication. For example, the electronic documents may be automatically attached to the reply and/or link(s) to the electronic documents automatically provided in the reply. Also, for example, one or more user interface indications (e.g., graphical, audible) of the electronic documents may be presented and, when a user generating the reply selects one of the indications via a user interface input, the corresponding electronic document(s) may be attached to the reply and/or link(s) to the documents automatically provided in the reply. In some implementations, the electronic document(s) may be provided for inclusion in the reply before the user has provided any textual content for the reply and/or before the user has provided any other content for the reply. In some implementations, the electronic document(s) may be provided in response to the user selecting an "attachment" document interface element or in response to other user interface input indicative of a desire to include an attachment in the reply.

The electronic document(s) selected for providing to a user for inclusion in a reply to an electronic communication may be identified from one or more of various corpuses such as one or more cloud-based corpuses associated with the user, local storage device(s) of a computing device being utilized by the user to generate the reply, local network storage device(s) accessible to the computing device and/or the user, etc. In some implementations, the electronic document(s) may be located by issuing a search of one or more corpuses of documents, where the search includes one or more search parameters that are derived from the electronic communication. As one example, where a message includes "can you send me the photos from your trip to Chicago last week?", a search may be issued using an "images" search parameter derived from an n-gram of the message (e.g., "photos"), using a date search parameter derived from an n-gram of the message (e.g., "last week"), and/or using a location search parameter derived from an n-gram of the message (e.g., "Chicago") to identify photos that meet the search criteria. In some implementations, the corpus(es) that are searched to identify documents to provide for inclusion in a reply may be restricted based on one or more features derived from the electronic communication. For example, in the previous example the corpuses searched may be restricted to a single corpus that includes only images and optionally other media, based on an n-gram of the message (e.g., "photos").

In some implementations, which non-textual reply content is provided for inclusion in a reply to an electronic communication may be determined based on output provided by a trained machine learning system in response to providing the trained machine learning system with one or more message features of the electronic communication. For example, the trained machine learning system may provide one or more features of non-textual reply content (e.g., document type(s)) that may be used as a search parameter in a search issued to identify the non-textual reply content and/or may be used to restrict one or more corpuses of a search issued to identify the non-textual reply content.

In some implementations, whether and/or how non-textual reply content is provided for inclusion in a reply to an electronic communication may be determined based on output provided by a trained machine learning system in response to providing the trained machine learning system with one or more message features of the electronic communication. For example, the trained machine learning system may provide a likelihood that a reply to the electronic communication will include non-textual reply content, and the likelihood may be utilized to determine whether and/or how non-textual reply content is provided to a user for inclusion in a reply to the electronic communication.

Some implementations are directed generally toward analyzing a corpus of electronic communications to determine relationships between one or more original message features of "original" messages of electronic communications and non-textual reply content that is included in "reply" messages of those electronic communications. For example, the corpus may be analyzed to determine relationships between message features of original messages and a likelihood that replies to original messages having those message features include a document and/or a link to a document. Also, for example, the corpus may be analyzed to determine relationships between message features of original messages and document type(s) (e.g., images, videos, media, PDF, slides) of documents that are included or linked to in replies to original messages having those message features.

As one example, the corpus may be analyzed to determine that original messages that include the n-gram "send me" are likely to include a document and/or a link to the document in replies to those original messages. As another example, the corpus may be analyzed to determine that original messages that include the n-gram "presentation" often include files having ".ppt", ".cvs", or ".pdf" extensions in replies to those original messages.

These relationships that are learned from analyzing the corpus of past electronic communications may be utilized, for example, to determine one or more search parameters for the issued search discussed above, to restrict the corpus(es) of the issued search discussed above, and/or to determine whether and/or how electronic documents are provided for inclusion in a reply to the message (e.g., a low likelihood that a reply will include an electronic document may lead to no documents being provided, or the document(s) being "suggested" in a less conspicuous manner).

In some implementations, determining relationships between one or more original message features of "original" messages of electronic communications and non-textual reply content that is included in "reply" messages of those electronic communications may be achieved via generating appropriate training examples based on a corpus of electronic communications and training a machine learning system based on those training examples. The machine learning system may be trained to receive, as input, one or more message features of an "original message" and to provide, as output, at least one feature related to non-textual reply content, such as one of the features described above.

For example, in some implementations training examples may be generated that each have an output parameter indicative of type(s) of document(s) included in a reply message of a corresponding electronic communication and one or more input parameters based on the original message of the corresponding electronic communication. For instance, a first training example may include, as an output parameter, a document type of "image", and as an input parameter, all or portions of the text of the original message (and optionally annotations associated with the text) of a first electronic communication that includes an image in a reply message. A second training example may include, as an output parameter, a document type of "image", and as an input parameter, all or portions of the text of the original message (and optionally annotations associated with the text) of a second electronic communication that includes an image in a reply message. Additional training examples may be similarly generated, including additional examples with output parameter(s) based on other type(s) of documents of a reply message of a corresponding electronic communication and input parameters based on the original message of the corresponding electronic communication. The machine learning system may be trained based on the training examples.

In some implementations, a method may be provided that is performed by at least one computing device and includes identifying an electronic communication sent to a user, determining a message feature of the electronic communication, and issuing a search of one or more corpuses of electronic documents using a search parameter for the search that is based on the message feature of the electronic communication. The method further includes receiving, in response to issuing the search, an indication of a subgroup of one or more of the electronic documents of the one or more corpuses that are responsive to the search. The method further includes selecting, based on receiving the indication, at least one selected electronic document of the electronic documents of the subgroup and providing at least a portion of the at least one selected electronic document for inclusion in a reply electronic communication that is a reply by the user to the electronic communication.

This method and other implementations of technology disclosed herein may each optionally include one or more of the following features.

In some implementations, issuing the search occurs independent of any textual input provided via a computing device of the user in generating the reply electronic communication. In some of those implementations, providing the at least a portion of the at least one selected electronic document for inclusion in the reply electronic communication occurs independent of any textual input provided via the computing device in generating the reply electronic communication.

In some implementations, at least one of the one or more corpuses is not publicly accessible, but is accessible to the user. In some of those implementations, the at least one of the one or more corpuses is accessible only to the user and to one or more additional users or systems authorized by the user.

In some implementations, issuing the search of the one or more corpuses includes issuing a search of one or more indexes that index the electronic documents of the one or more corpuses.

In some implementations, the subgroup includes a plurality of the electronic documents and the method further includes receiving, in response to issuing the search, search rankings for the subgroup of the electronic documents of the one or more corpuses that are responsive to the search. The selecting the at least one selected electronic document of the electronic documents of the subgroup may be further based on the search rankings for the subgroup of the electronic documents. In some of those implementations, the at least one selected electronic document includes a first document and a second document and providing the at least a portion of the at least one selected electronic document for inclusion in the reply electronic communication includes: determining a prominence for providing the first document and the second document based on the search result rankings, and providing both the first document and the second document for inclusion in the reply to the electronic communication along with an indication of the prominences.

In some implementations, the method further includes determining an additional message feature of the electronic communication and restricting the one or more corpuses of the search based on the additional message feature of the electronic communication.

In some implementations, providing the at least a portion of the at least one selected electronic document for inclusion in the reply electronic communication includes attaching the at least a portion of the at least one selected electronic document to the reply without requiring confirmation by the user via user interface input initiated by the user.

In some implementations, providing the at least a portion of the at least one selected electronic document for inclusion in the reply electronic communication comprises includes: providing a graphical indication of the at least a portion of the at least one selected electronic document; receiving a selection of the graphical indication via a user interface input device; and in response to receiving the selection, attaching the at least one selected electronic document to the reply.

In some implementations, providing the at least a portion of the at least one selected electronic document for inclusion in the reply electronic communication includes providing a link in the reply, where the link maps to the at least a portion of the at least one selected electronic document.

In some implementations, the at least one selected electronic document comprises a first document and a second document and providing the at least a portion of the at least one selected electronic document for inclusion in the reply electronic communication includes: providing a first graphical indication of the first document and a second graphical indication of the second document; receiving a selection of one of the first graphical indication and the second graphical indication via a user interface input device; and in response to receiving the selection, attaching a corresponding one of the first document and the second document to the reply.

In some implementations, the method further includes: determining an additional message feature of the electronic communication; providing at least the additional message feature as input to a trained machine learning system; receiving at least one document feature as output from the trained machine learning system; and using an additional search parameter for the search that is based on the at least one document feature. In some of those implementations, the at least one document feature includes a document type feature that indicates a closed class of one or more filename extensions.

In some implementations, the method further includes: determining an additional message feature of the electronic communication; providing at least the additional message feature as input to a trained machine learning system; receiving at least one document feature as output from the trained machine learning system. In some of those implementations, selecting the at least one selected electronic document is further based on the at least one document feature.

In some implementations, the method further includes: determining an additional message feature of the electronic communication; providing at least the additional message feature as input to a trained machine learning system; receiving at least one document feature as output from the trained machine learning system; and restricting the one or more corpuses of the search based on the at least one document feature.

In some implementations, the message feature is an embedding vector of one or more features from the electronic communication.

In some implementations, the message feature is based on an n-gram in a body of the electronic communication and wherein determining the message feature based on the n-gram is based on proximity of the n-gram to a requesting verb n-gram in the body of the electronic communication.

In some implementations, the method further includes labeling each of a plurality of n-grams of the electronic communication with at least one corresponding grammatical annotation. In some of those implementations, determining the message feature includes selecting an n-gram of the n-grams based on the corresponding grammatical annotation of the n-gram, and determining the message feature based on the n-gram.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A, FIG. 4B, FIG. 4C, FIG. 4D1, FIG. 4D2, and FIG. 4E illustrate example graphical user interfaces for providing non-textual reply content for inclusion in a reply to an electronic communication.

DETAILED DESCRIPTION

Figure 1:
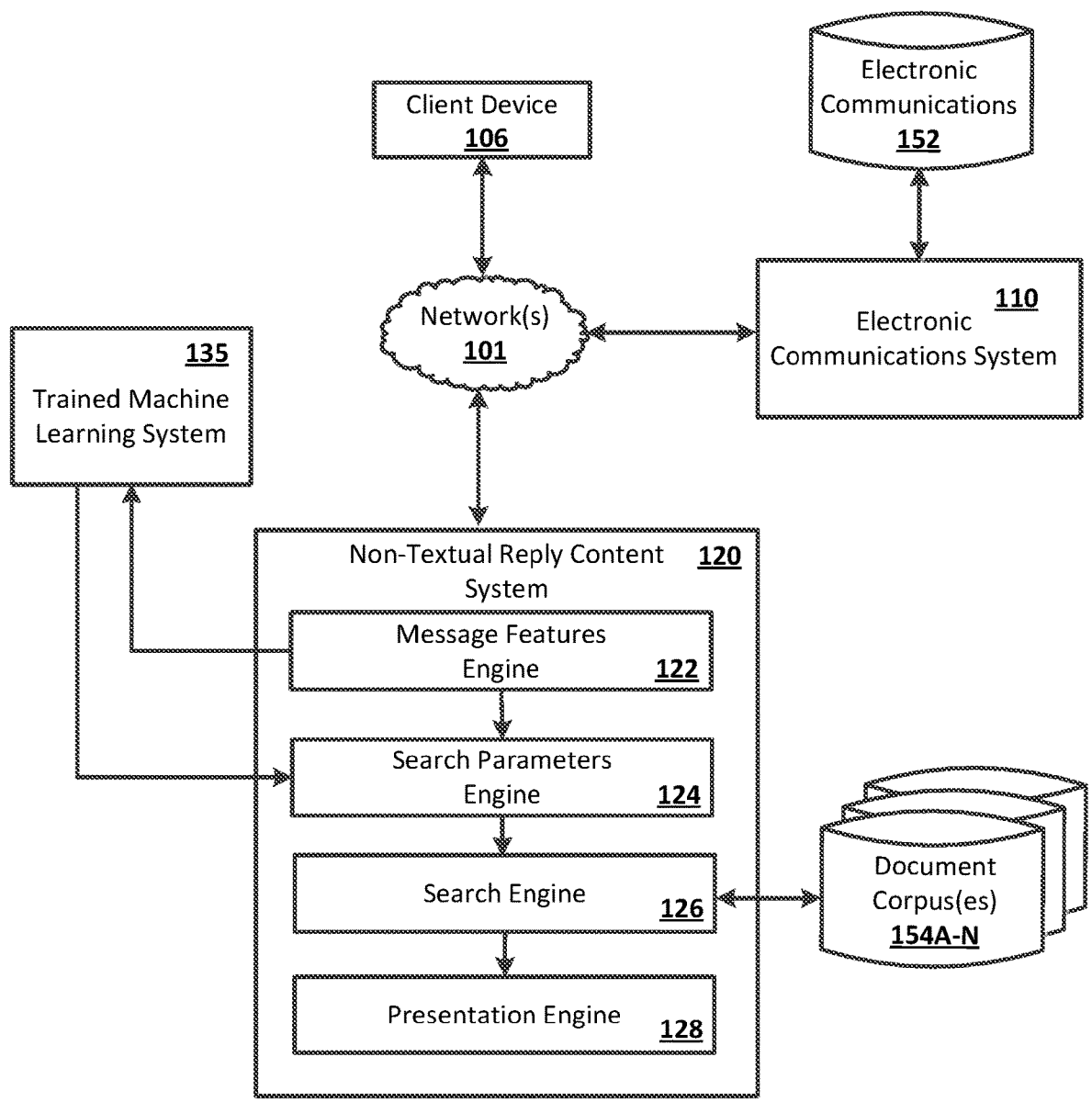
FIG. 1 illustrates an example environment in which non-textual reply content to include in a reply to an electronic communication may be determined based on one or more message features of the electronic communication.

FIG. 1 illustrates an example environment in which non-textual reply content to include in a reply to an electronic communication may be determined based on one or more message features of the electronic communication. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a client device 106, an electronic communications system 110, non-textual reply content system 120, at least one trained machine learning system 135, electronic document corpuses 154A-N, and at least one electronic communications database 152.

Electronic communications system 110, non-textual reply content system 120, and trained machine learning system 135 may each be implemented in one or more computing devices that communicate, for example, through a network (e.g., network 101 and/or other network). Electronic communications system 110, non-textual reply content system 120, and trained machine learning system 135 are example systems in which the systems, components, and techniques described herein may be implemented and/or with which systems, components, and techniques described herein may interface. Electronic communications system 110, non-textual reply content system 120, and trained machine learning system 135 each include one or more memories for storage of data and software applications, one or more processors for accessing data and executing applications, and other components that facilitate communication over a network. In some implementations, electronic communications system 110, non-textual reply content system 120, and trained machine learning system 135 may include one or more components of the example computing device of FIG. 8. The operations performed by electronic communications system 110, non-textual reply content system 120, and trained machine learning system 135 may be distributed across multiple computer systems. In some implementations, one or more aspects of electronic communications system 110, non-textual reply content system 120, and/or trained machine learning system 135 may be combined in a single system and/or one or more aspects may be implemented on the client device 106.

Generally, in some implementations non-textual reply content system 120 determines and provides non-textual reply content to include in a reply to an electronic communication, such as an electronic communication provided by client device 106 and/or an electronic communication of electronic communications database 152 to which a user has yet to reply. The non-textual reply content system 120 may determine the non-textual reply content based on one or more message features of the electronic communication. In some implementations, the non-textual reply content system 120 may provide the determined non-textual reply content for inclusion in a reply to a communication independent of any textual input provided by the user in generating the reply to the communication and/or independent any other content provided by the user in generating the reply to the communication.

In some implementations, the non-textual reply content determined and provided by non-textual reply content system 120 includes all or portions of one or more electronic documents that are responsive to the electronic communication, such as one or more electronic images, videos, word processing documents, spreadsheets, slide decks, structured data that includes a user's travel plans, other electronic communications, etc. The electronic document(s) determined and provided for an electronic communication are document(s) that are separate from and in addition to the electronic communication itself, and separate from and in addition to the reply to the electronic communication. The electronic documents may be selected from one or more electronic document corpuses 154A-N provided on one or more storage mediums. In some implementations, the one or more electronic document corpuses 154A-N from which an electronic document is selected for inclusion in a reply of a user may include, or be restricted to, one or more corpuses that are not publicly accessible, but that are accessible to the user. For example, one or more of the electronic document corpuses 154A-N may be accessible only to the user and one or more systems and/or other users authorized by the user. For instance, one or more of the electronic document corpuses 154A-N may be one or more cloud-based corpuses accessible to the user, local storage device(s) of a computing device (e.g., client device 106) of the user that is being utilized to generate the reply, local network storage device(s) accessible to the computing device and/or the user, etc. As described herein, in some implementations the non-textual reply content system 120 may select the electronic document(s) for inclusion in a reply from a group of electronic documents received in response to issuing a search of one or more of the electronic document corpuses 154A-N, where the search includes one or more search parameters that are derived from an electronic communication to which the reply is responsive.

The electronic communications database 152 includes one or more storage mediums that include all, or portions of, electronic communications of a plurality of users. In some implementations, the electronic communications database 152 is maintained by the electronic communications system 110. For example, the electronic communications system 110 may include one or more email systems and the electronic communications database 152 may include a plurality of emails that are sent and/or received via the email systems. As another example, the electronic communications system 110 may include one or more social networking systems and the electronic communications database 152 may include a plurality of messages, posts, or other communications that are sent and/or received via the social networking systems.

As used herein, an "electronic communication" or "communication" may refer to an email, a text message (e.g., SMS, MMS), an instant message, a transcribed voicemail, or any other electronic communication that is sent from a first user to a restricted group of one or more additional users. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth.

As used herein, "electronic communication" and "communication" will be utilized, depending on the context, to refer to both an electronic communication that includes only an original message and an electronic communication that includes one or more original messages and includes one or more reply messages. An electronic communication may be a single document such as an email that includes both an original message and a reply message and that can be processed to distinguish the original message and the reply message. Processing an electronic communication to distinguish an original message and a reply message may include "splitting" the message based on presence of metadata, message breaks, header information included in the message, quotes provided around the original message, etc. An electronic communication may also be multiple documents that are mapped to one another based on at least one of the multiple documents being responsive to other of the multiple documents. For example, an electronic communication may include a first email that is an original message received by a user and a second email sent by the user as a reply to that original message, or original and reply SMS messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

As used herein, an original message is earlier in time to a responsive reply message, but is not necessarily the first message in an electronic communication. For example, an original message may be the first in time message in an electronic communication and a reply message that is responsive to that original message may be a later in time (e.g., the next in time) message. Also, for example, an original message may additionally and/or alternatively be the second, third, or fourth in time message in an electronic communication and a reply message that is responsive to that original message may be a later in time message in the electronic communication. Each of an original message and a reply message may include one or more of associated text, metadata, and/or other content (e.g., attached document(s), link(s) to document(s)).

In various implementations, non-textual reply content system 120 may include a message features engine 122, a search parameters engine 124, a search engine 126, and/or a presentation engine 128. In some implementations, all or aspects of engines 122, 124, 126, and/or 128 may be omitted. In some implementations, all or aspects of engines 122, 124, 126, and/or 128 may be combined. In some implementations, all or aspects of engines 122, 124, 126, and/or 128 may be implemented in a component that is separate from non-textual reply content system 120, such as client device 106 and/or electronic communications system 110.

Description of the engines 122, 124, 126, and 128 is provided below with reference to an electronic communication of a user, such as an electronic communication provided by client device 106 and/or an electronic communication of electronic communications database 152 to which the user has yet to reply. Although a single electronic communication is referenced in the examples for clarity, it is understood that the non-textual reply content system 120 may determine reply content for additional electronic communications of the user and/or of additional users.

The message features engine 122 determines one or more original message features based on an electronic communication sent to a user (i.e., based at least in part on the content of the electronic communication as that content was sent to the user). Various original message features may be utilized. For example, message features engine 122 may determine one or more n-grams in the electronic communication as message features. For instance, one or more of the n-grams may be determined based on term frequency of the n-gram in the electronic communication (i.e., how often the n-gram occurs in the electronic communication) and/or inverse document frequency of the n-gram in a collection of documents (i.e., how often the n-gram occurs in a collection of documents, such as a collection of electronic communications). Also, for instance, one or more of the n-grams may be determined based on positional proximity of the n-gram to one or more other n-grams, such as a requesting verb n-gram (e.g., "send", "provide", "attach"). As yet another instance, one or more of the n-grams may be determined based on a part of speech of the n-gram (e.g., "noun") or based on the n-gram being included in a listing of potentially relevant n-grams and/or not being included in a listing of irrelevant n-grams (e.g., stop words such as "an", "a", and "the").

Also, for example, message features engine 122 may determine co-occurrence of two or more n-grams in the electronic communication as a message feature, such as co-occurrence in a particular order (e.g., a first n-gram before a second n-gram), in a certain positional relationship (e.g., within n terms or characters of one another), etc. Also, for example, message features engine 122 may determine one or more message features based on one or more natural language processing tags or other labels applied to text of the electronic communication (e.g., parts of speech, named entities, entity types, tone); features based on text that occurs specifically in the subjects, the first sentences, the last sentences, or other portion of the electronic communication; features based on metadata of the electronic communication such as a time the electronic communication was sent, day of the week the electronic communication was sent, a number of recipients, a type of device that sent the electronic communication, etc.

Also, for example, message features engine 122 may determine an embedding vector of one or more features from the entire electronic communication or a subset of the electronic communication (e.g., one or more paragraphs, one or more sentences, one or more words). The features of the embedding vector may include one or more n-grams, labels applied to one or more n-grams, syntactic features, semantic features, metadata features, and/or other features.

As one specific example, assume the electronic communication includes a subject with the text "spreadsheet" and a body with the text "Please send me yesterday's sales spreadsheet. Thanks." The message features engine 122 may determine message features that include the n-grams "send", "yesterday", "sales", and "spreadsheet", while excluding other n-grams such as "Please" and "thanks." For example, the message features engine 122 may determine "send" as a message feature based on it being a requesting verb n-gram, may determine "yesterday" as a message feature based on it being a temporal indicator and/or based on it being in close positional proximity to "send", may determine "sales" as an n-gram based on it being a noun in the text and/or based on it being in close positional proximity to "send", and may determine "spreadsheet" as an n-gram based on it being a noun, based on it being in close positional proximity to "send", and/or based on it being in a listing of potentially relevant terms.

The message features engine 122 provides determined message features to search parameters engine 124 and optionally to trained machine learning system 135. The message features engine 122 may provide the same message features to search parameters engine 124 and to trained machine learning system 135, or the provided message features may differ. The search parameters engine 124 generates one or more search parameters based on one or more of the message features provided by message features engine 122.

As one example of generating search parameters based on one or more of the message features provided by message features engine 122, assume the message features engine 122 provides a group of message features that include the n-grams "send", "yesterday", "sales", and "spreadsheet". The search parameters engine 124 may generate a date search parameter based on "yesterday." For example, the date search parameter may specify a date of creation and/or most recent modification for a document and may be "yesterday" or may be one or more particular dates specified based on "yesterday". The search parameters engine 124 may also generate additional search parameters of "sales" and "spreadsheet". The "sales" search parameter may be a general textual parameter. The "spreadsheet" search parameter may be a general textual parameter and/or a document type search parameter that biases those type(s) of documents in a search, restricts a search to one or more types of documents (e.g., those having a ".pdf", ".xls", ".ods", ".csv", and/or ".tsv" filename extension), and/or restricts a search to one or more corpuses that include (and are optionally restricted to) documents of the type of documents.

As another example of generating search parameters based on one or more of the message features provided by message features engine 122, assume the message features engine 122 provides an embedding vector of one or more features from the entire electronic communication or a subset of the electronic communication. The search parameters engine 124 may generate search parameters based on a decoded version of the embedding vector.

The search parameters engine 124 may also optionally generate one or more search parameters based on output provided by the at least one trained machine learning system 135 to the search parameters engine 124. For example, as described herein (see e.g., FIGS. 5-7), the trained machine learning system 135 may be trained to receive, as input, one or more message features and to provide, as output, one or more features of non-textual reply content, such as one or more document types of non-textual reply content. The search parameters engine 124 may utilize one or more of the features of the output to generate a search parameter. For example, where the trained machine learning system 135 provides output of document type(s) of non-textual reply content based on input of message features for an electronic communication, the document type(s) may be used as a search parameter that biases those type(s) of documents, that restricts the search to those type(s) of documents, and/or restricts the search to one or more corpuses that include (and are optionally restricted to) documents of those type(s).

In some implementations, the search parameters engine 124 may determine whether to generate search parameters for the electronic communication based on output provided by the at least one trained machine learning system 135 to the search parameters engine 124. For example, as described herein (see e.g., FIGS. 5-7), the at least one trained machine learning system 135 may be trained to receive, as input, one or more message features and to provide, as output, a likelihood that a reply to the electronic communication will include non-textual reply content. The search parameters engine 124 may utilize the likelihood in determining whether to generate search parameters. For example, the search parameters engine 124 may generate search parameters only if the likelihood satisfies a threshold.

The search engine 126 searches one or more of the electronic document corpuses 154A-N based on the search parameters determined by search parameters engine 124. In some implementations, searching one or more of the electronic document corpuses 154A-N may include searching one or more indexes that index the electronic documents of one or more of the document corpuses. The search engine 126 may issue one or more searches based on the search parameters, that each combine the search parameters in one or more manners. For example, the search engine 126 may issue one or more searches to identify documents that satisfy each of a group of one or more (e.g., all) of the search parameters (e.g., a search that combines multiple search parameters with "AND"). Also, for example, the search engine 126 may issue one or more searches to identify documents that satisfy only some of the search parameters (e.g., a search that combines multiple search parameters with "OR"). In some implementations, the search engine 126 may identify a portion of a document in response to a search. For example, the search engine 126 may identify one or more paragraphs of a multi paragraph document, one or more slides of a slide deck, one or more sentences of a document with multiple sentences, etc.

In some implementations, the search engine 126 may identify multiple documents in response to a search based on one or more search parameters derived from an electronic communication. In some of those implementations, the multiple documents may each be ranked based on various criteria such as a query based score (e.g., based on how closely a document matches the query) and/or a document based score. A query based score of a document is based on a relationship between the query and the document, such as how closely the document matches the query. For example, a first document that includes each word of a query may have a "higher" query based score than a second document that only includes some of the words of the query. Also, for example, a first document that includes all words of the query in a title and/or other prominent position may have a "higher" query based score than a second document that only includes words of the query in the last portion of a body of the second document. A document based score of a document is based on one or more properties of the document that are independent of the query. For example, the document based score of a document may be based on popularity of the document for the user (e.g., frequency of access by the user), based on a date the user and/or other user last accessed the document, based on a date the document was created, etc.

The search engine 126 provides, to the presentation engine 128, indications (e.g., document identifiers) of one or more of the electronic documents that are responsive to the search, and optionally the ranking of the electronic documents. The presentation engine 128 selects one or more of the electronic documents and provides the selected electronic documents for inclusion in a reply electronic communication that is a reply by the user to the electronic communication.

Providing an electronic document for inclusion in a reply may include, for example, providing the actual document (e.g., embedding or otherwise attaching the document), providing a link to the document, providing a user interface indication of the document that is associated with the document, etc. For example, the presentation engine 128 may automatically attach a selected electronic document to the reply and/or automatically incorporate link(s) to the electronic documents in the reply. Also, for example, the presentation engine 128 may present one or more user interface indications (e.g., graphical, audible) of the electronic documents and, when a user generating the reply selects one of the indications, the corresponding electronic document(s) may be attached to the reply and/or link(s) to the documents automatically provided in the reply. In some implementations, the electronic document(s) may be provided for inclusion in a reply in response to the user selecting an "attachment" document interface element or in response to other user interface input indicative of a desire to include an attachment in the reply.

In some implementations, the presentation engine 128 selects the electronic documents and/or provides the electronic documents independent of any textual input and/or other content provided via a computing device of the user in generating a reply to the electronic communication. In some of those implementations, the presentation engine 128 selects the electronic documents before the user has even viewed or otherwise consumed the communication. For example, the non-textual reply content system 120 may process a communication in advance of viewing by the user, presentation engine 128 may select one or more electronic documents for inclusion in a reply to the communication, and append or otherwise associate the selected electronic documents with the electronic communication before it is even viewed by the user.

In some implementations, the presentation engine 128 selects and/or provides the electronic documents for inclusion in the reply based on the optional ranking provided by the search engine 126. For example, in some implementations the presentation engine 128 may only select an electronic document when its associated ranking satisfies a threshold (e.g., if it is one of the X highest ranked electronic documents). Also, for example, the prominence with which a selected electronic document is provided and/or how the selected electronic document is provided may be based on the ranking of the selected electronic document.

In some implementations, the presentation engine 128 may select and provide multiple electronic documents for inclusion in a reply. In some of those implementations, the multiple electronic documents may be provided based on the optional ranking of the electronic documents. For example, a presentation prominence for each of the multiple electronic documents may be determined based on the ranking and the multiple documents provided for potential inclusion in the reply to the electronic communication, along with an indication of the presentation prominences.

In some implementations where the electronic communication is provided to the non-textual reply content system 120 by the client device 106, the presentation engine 128 may provide the selected electronic documents to the client device 106 for presentation to the user as an option for including in a reply. In some implementations where the electronic communication is provided to the non-textual reply content system 120 by the electronic communications system 110 via the electronic communications database 152, the presentation engine 128 may store an association of the selected electronic documents with the electronic communication in the electronic communications database 152 and/or other database. In some implementations, one or more (e.g., all) aspects of the presentation engine 128 may be implemented by the client device 106 and/or the electronic communications system 110.

The presentation engine 128 may also provide display prominence information with the selected electronic documents that indicates the prominence (e.g., position, size, color) with which the selected electronic documents should be presented. Generally, a higher ranking for a particular selected electronic document, the greater the prominence for that electronic document. As one example, where multiple electronic documents are selected by the presentation engine 128, the presentation engine 128 may provide an indication of the ranking of those multiple electronic documents for use in determining in which order the multiple candidates should be presented to a user via a user interface output device of the client device 106.

In some implementations, the presentation engine 128 provides only document identifier(s) of selected documents, and potentially prominence information, and the client device 106 and/or electronic communications system 110 may generate a display of the selected documents based on the provided data. In some implementations, the presentation engine 128 may additionally provide some or all of the data necessary to generate the display. In some of those implementations, any provided prominence information may be incorporated in the data that indicates how the display should be presented.

In some implementations, the presentation engine 128 may determine whether and/or how to provide to provide electronic document(s) for inclusion in a reply based on output provided by the at least one trained machine learning system 135 in response to original message features provided to the trained machine learning system 135 by message features engine 122. For example, as described herein, the at least one trained machine learning system 135 may be trained to receive, as input, one or more message features and to provide, as output, a likelihood that a reply to the electronic communication will include non-textual reply content. In some implementations, the presentation engine 128 may utilize the likelihood in determining whether to provide to provide electronic document(s) for inclusion in a reply. For example, the presentation engine 128 may provide electronic document(s) for inclusion in a reply only if the likelihood satisfies a threshold. In some implementations, the presentation engine 128 may utilize the likelihood in determining how to provide electronic document(s) for inclusion in a reply. For example, the presentation engine 128 may automatically include the electronic documents in a reply if the likelihood satisfies a threshold, but may require user interface input before including them in the reply if the likelihood does not satisfy the threshold. Also, for example, the presentation engine 128 may: if the likelihood is greater than or equal to X (e.g., X=0.8), provide the electronic documents for inclusion in a reply before any user interface input has been provided indicating a desire to reply (e.g., FIG. 4A); may, if the likelihood is less than X and greater than or equal to Y (e.g., Y=0.5), require user interface input indicating a desire to reply (e.g., FIG. 4B) before providing the electronic document; and may, if the likelihood is less than Y, require user interface input indicating a desire to attach a document (e.g., FIGS. 4D1 and 4D2) before providing the electronic document.

Figure 2:
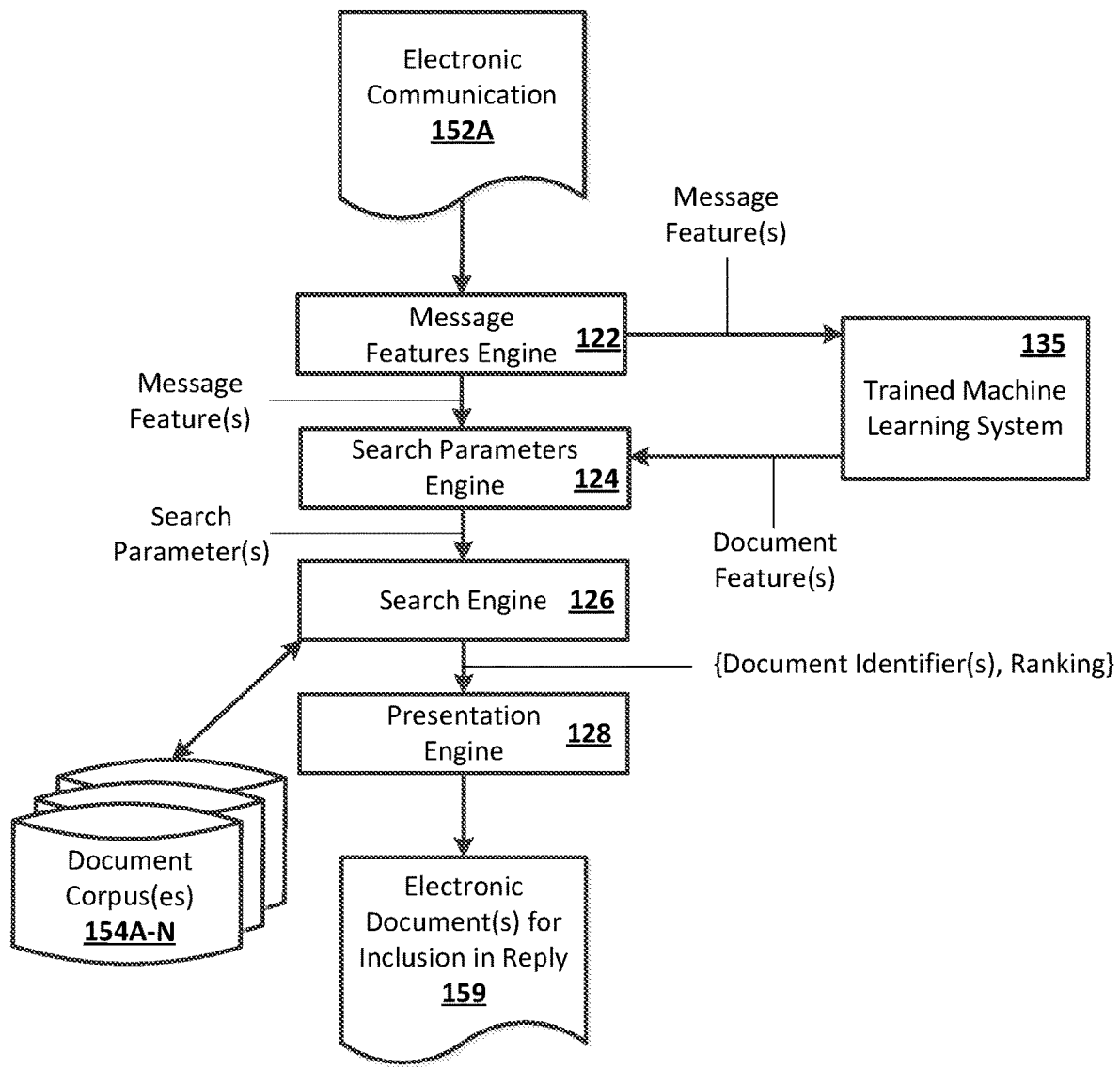
FIG. 2 illustrates an example of how non-textual reply content to include in a reply to an electronic communication may be determined based on one or more message features of the electronic communication.

FIG. 2 illustrates an example of how non-textual reply content to include in a reply to an electronic communication may be determined based on one or more message features of the communication. Message features engine 122 determines one or more message features of an electronic communication 152A sent to a user. Electronic communication 152A may be provided by, for example, client device 106 or electronic communications system 110 of FIG. 1.

The message features engine 122 provides one or more of the determined message features to search parameters engine 124 and provides one or more of the determined message features to the at least one trained machine learning system 135. The message features provided by the message features engine 122 to the search parameters engine 124 and to the machine learning systems 135 may be the same, or may differ.

The trained machine learning system 135 provides, based on the received message features, one or more document features to the search parameters engine 124. The one or more document features may be, for example, one or more document types of non-textual reply content. The search parameters engine 124 may utilize one or more of the document features to generate a search parameter. For example, where one of the trained machine learning systems 135 provides output of document type(s) of non-textual reply content based on input of message features for an electronic communication, the document type(s) may be used as a search parameter that biases those type(s) of documents, that restricts the search to those type(s) of documents, and/or restricts the search to one or more corpuses that include (and are optionally restricted to) documents of those type(s). The search parameters engine 124 also generates one or more search parameters based on the message features received from the message features engine 122.

The search parameters engine 124 provides the search parameters to the search engine 126. The search engine 126 searches one or more of the electronic document corpuses 154A-N based on the search parameters determined by search parameters engine 124. In some implementations, searching one or more of the electronic document corpuses 154A-N may include searching one or more indexes that index the electronic documents of one or more of the document corpuses. The search engine 126 may issue one or more searches based on the search parameters, that each combine the search parameters in one or more manners. In some implementations, the search engine 126 may identify multiple documents in response to a search based on one or more search parameters derived from an electronic communication. In some of those implementations, the multiple documents may each be ranked based on various criteria such as a query based and/or a document based score.

The search engine 126 provides, to the presentation engine 128, document identifiers of one or more of the electronic documents that are responsive to the search, and also provides the optional ranking of the electronic documents.

The presentation engine 128 selects one or more of the electronic documents and provides the selected electronic documents 159 for inclusion in a reply electronic communication that is a reply by the user to the electronic communication. Providing an electronic document for inclusion in a reply may include, for example, providing the actual document, providing a link to the document, providing a user interface indication of the document that is associated with the document, etc.

Figure 3:
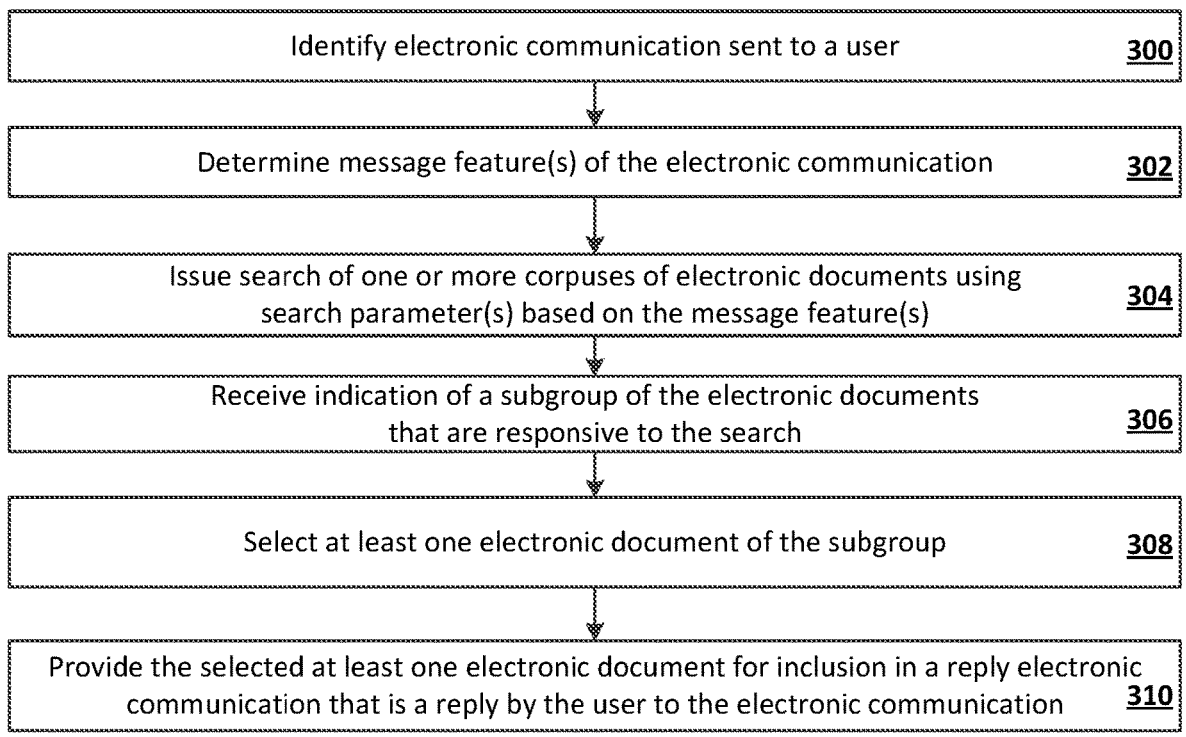
FIG. 3 is a flow chart illustrating an example method of determining non-textual reply content to include in a reply to an electronic communication based on one or more message features of the electronic communication.

FIG. 3 is a flow chart illustrating an example method of determining non-textual reply content to include in a reply to an electronic communication based on one or more message features of the communication. For convenience, the operations of the flow chart are described with reference to a system that performs the operations. This system may include various components of various computer systems. For instance, some operations may be performed by one or more components of the non-textual reply content system 120, such as engines 122, 124, 126, and/or 128. Moreover, while operations of the method of FIG. 3 are shown in a particular order, this is not meant to be limiting. One or more operations may be reordered, omitted or added.

At block 300, the system identifies an electronic communication sent to a user.

At block 302, the system determines one or more message features of the electronic communication. Various original message features may be utilized such as textual, semantic, and/or syntactic features. For example, the system may determine message features based on more n-grams in the electronic communication, co-occurrence of two or more n-grams in the electronic communication, features based on text that occurs specifically in the subjects, the first sentences, the last sentences, or other portion of the electronic communication, features based on metadata of the electronic communication, etc.

At block 304, the system issues a search of one or more corpuses of electronic documents using search parameters that are based on one or more of the message features of block 302. For example, the system may use the message features as the search parameters and/or derive the search parameters from the message features. In some implementations, the system may provide one or more of the message features as input to a trained machine learning system and utilize output of the trained machine learning system as one or more of the search parameters and/or to derive one or more of the search parameters.

At block 306, the system receives an indication of a subgroup of electronic documents. The subgroup is a subgroup of the corpuses and represents electronic documents that are responsive to the search of block 304. In some implementations, the system also receives a ranking of the subgroup.

At block 308, the system selects at least one electronic document of the subgroup. For example, the system may select the at least one electronic document based on the optional ranking of block 306.

At block 310, the system provides the at least one electronic document for inclusion in a reply electronic communication that is a reply by the user to the electronic communication. Providing an electronic document for inclusion in a reply may include, for example, providing the actual document (e.g., embedding or otherwise attaching the document), providing a link to the document, providing a user interface indication of the document that is associated with the document, etc.

FIGS. 4A-4E illustrate example graphical user interfaces for providing non-textual reply content for inclusion in a reply to an electronic communication. The graphical user interfaces of FIGS. 4A-4E may be presented at client device 106 based on non-textual reply content that is determined and provided by non-textual reply content system 120. In some implementations, one or more aspects of non-textual reply content system 120 (e.g., all or aspects of presentation engine 128) may be incorporated, in whole or in part, on client device 106.

Figure 4A:
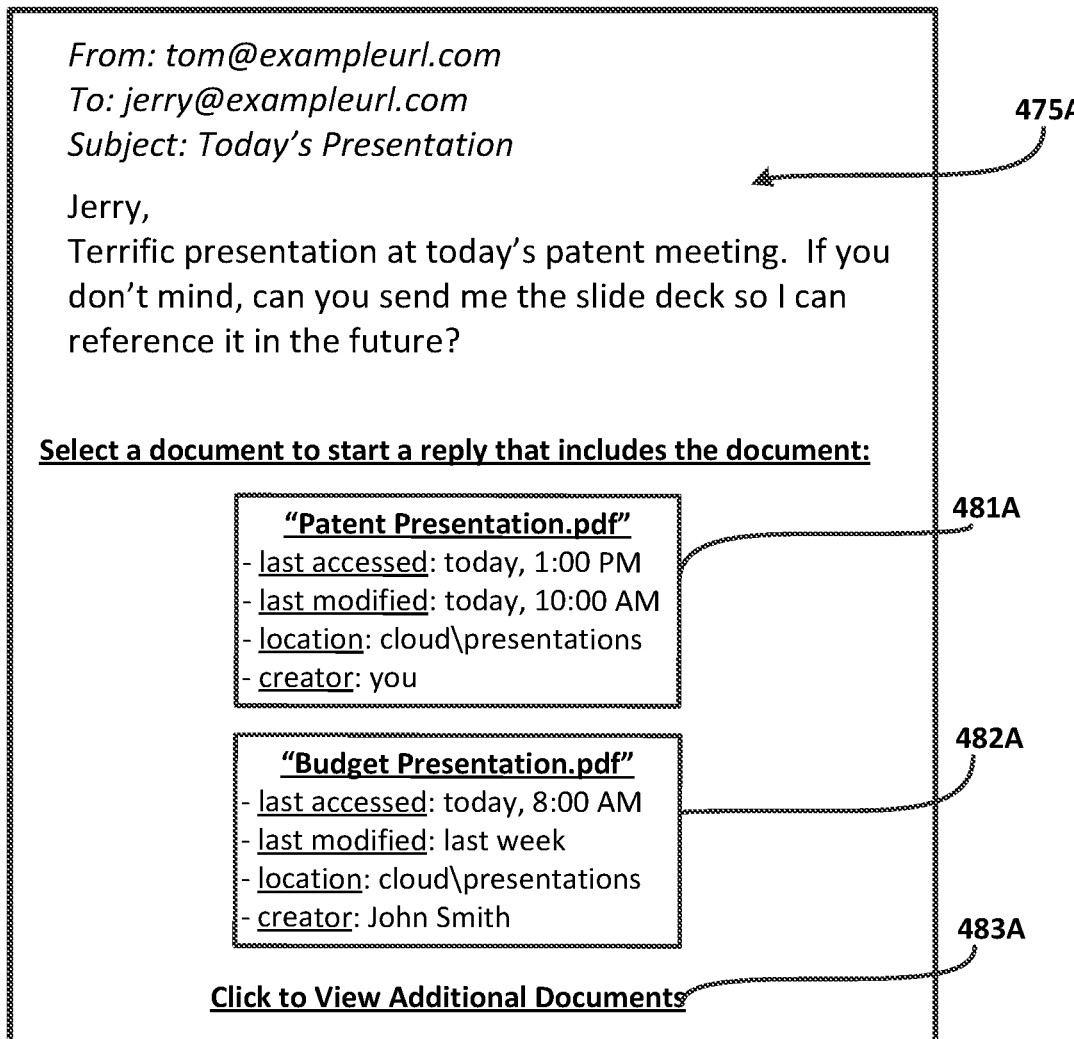

In FIG. 4A, an original email 475A that has been sent to a user is being viewed by the user, before the user has provided any user interface input to indicate a desire to reply to the original email 475A. The candidate electronic documents represented by graphical user interface elements 481A and 482A are determined based on the original email 475A and are presented for inclusion in a reply to the email. For example, a user selection of graphical user interface element 481A may automatically present an editable reply email to the user that includes the electronic document "Patent Presentation.pdf" attached to the reply, or a link to that electronic document incorporated in the reply (e.g., a hyperlink incorporated in the body of the reply). Likewise, a user selection of graphical user interface element 482A may automatically present an editable reply email to the user that includes the electronic document "Budget Presentation.pdf" attached to the reply, or a link to that electronic document incorporated in the reply (e.g., a hyperlink incorporated in the body of the reply). In some implementations, both graphical user interface elements 481A and 482A may be selected to include both associated electronic documents in the reply.

Graphical user interface elements 481A and 482A both include a title of the associated electronic document (presented in bold and underlined), along with associated additional information to facilitate user recollection of the associated electronic document. In particular, graphical user interface elements 481A and 482A each includes additional information indicating a temporal indication of when the document was last accessed by the user, a temporal indication of when the document was last modified, a corpus ("cloud") and corpus folder ("presentations") location of the document, and a creator indicating a user that created the document. Additional and/or alternative additional information may be provided such as a snippet of text from the document (e.g., the first X words of the document), an image of all or portions of the document, etc.

In some implementations, the presentation position of graphical user interface elements 481A and 482A may be based on determined display prominences that are based on rankings of the documents associated with those graphical user interface elements 481A and 482A. For example, graphical user interface element 481A may be presented positionally higher up than graphical user interface element 482A based on the document associated with graphical user interface element 481A being ranked higher than the document associated with graphical user interface element 482A. As described herein, the rankings of the documents may be rankings from a search issued with search parameters based on one or more message features of the original email 475A. Additional and/or alternative presentations based on rankings of the documents associated with the graphical user interface elements 481A and 482A may be provided. For example, graphical user interface element 481A may be highlighted and/or presented with more additional information than graphical user interface element 482A. FIG. 4A also includes a selectable graphical user interface element 483A that, when selected by the user, displays additional documents. The additional documents may be documents identified based on the original email (e.g., based on issuing a search with search parameters based on one or more message features of the original email), but having a lower ranking than the documents associated with graphical user interface elements 481A and 482A.

Figure 4B:
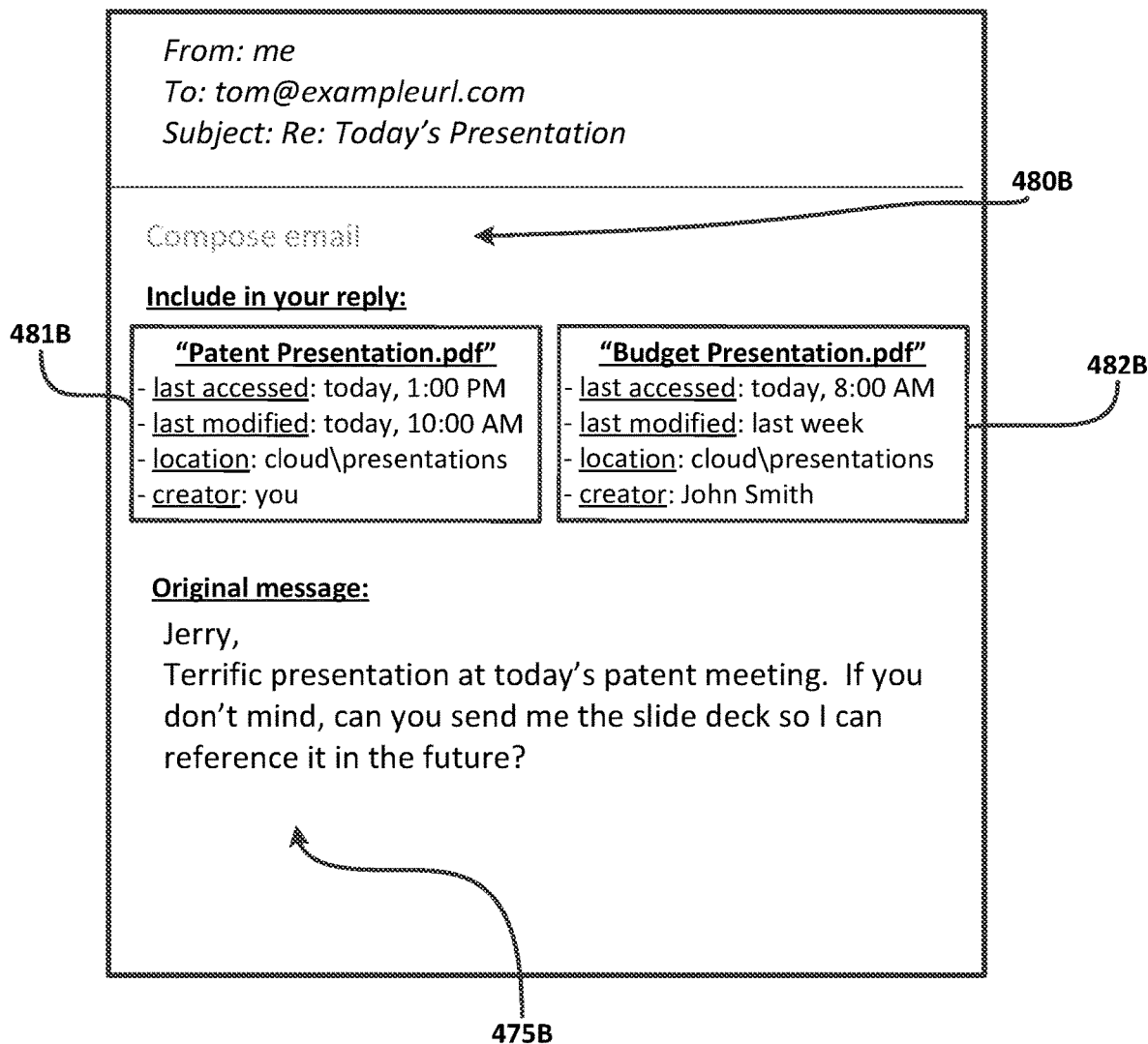

In FIG. 4B, a user has provided user interface input (e.g., selecting a "reply" graphical user interface element) to initiate a reply to an original email and is presented with a reply section 480B that includes phantom text "Compose email" indicating to the user that the user can compose a reply in the reply section 480B. The original email 475B to which the reply is responsive is also illustrated in FIG. 4B for reference of the user in generating the reply.

Graphical user interface elements 481B and 482B are presented in FIG. 4B for inclusion in the reply of associated candidate electronic documents determined based on the original email 475B. The graphical user interface elements 481B and 482B are presented before the user has provided any textual input or other content for the reply. User selection of graphical user interface element 481B may attach the electronic document "Patent Presentation.pdf" to the reply or incorporate a link to that electronic document in the reply (e.g., a hyperlink incorporated in the reply section 480B). Likewise, a user selection of graphical user interface element 482B may attach the electronic document "Budget Presentation.pdf" to the reply or incorporate a link to that electronic document in the reply. In some implementations, both graphical user interface elements 481B and 482B may be selected to include both associated electronic documents in the reply.

Graphical user interface elements 481B and 482B both include a title of the associated electronic document (presented in bold and underlined), along with associated additional information to facilitate user recollection of the associated electronic document. In some implementations, the presentation position of graphical user interface elements 481B and 482B may be based on determined display prominences that are based on rankings of the documents associated with those graphical user interface elements 481B and 482B. For example, graphical user interface element 481B may be presented positionally to the left of graphical user interface element 482B based on the document associated with graphical user interface element 481B being ranked higher than the document associated with graphical user interface element 482B. As described herein, the rankings of the documents may be rankings from a search issued with search parameters based on one or more message features of the original email.

Figure 4C:
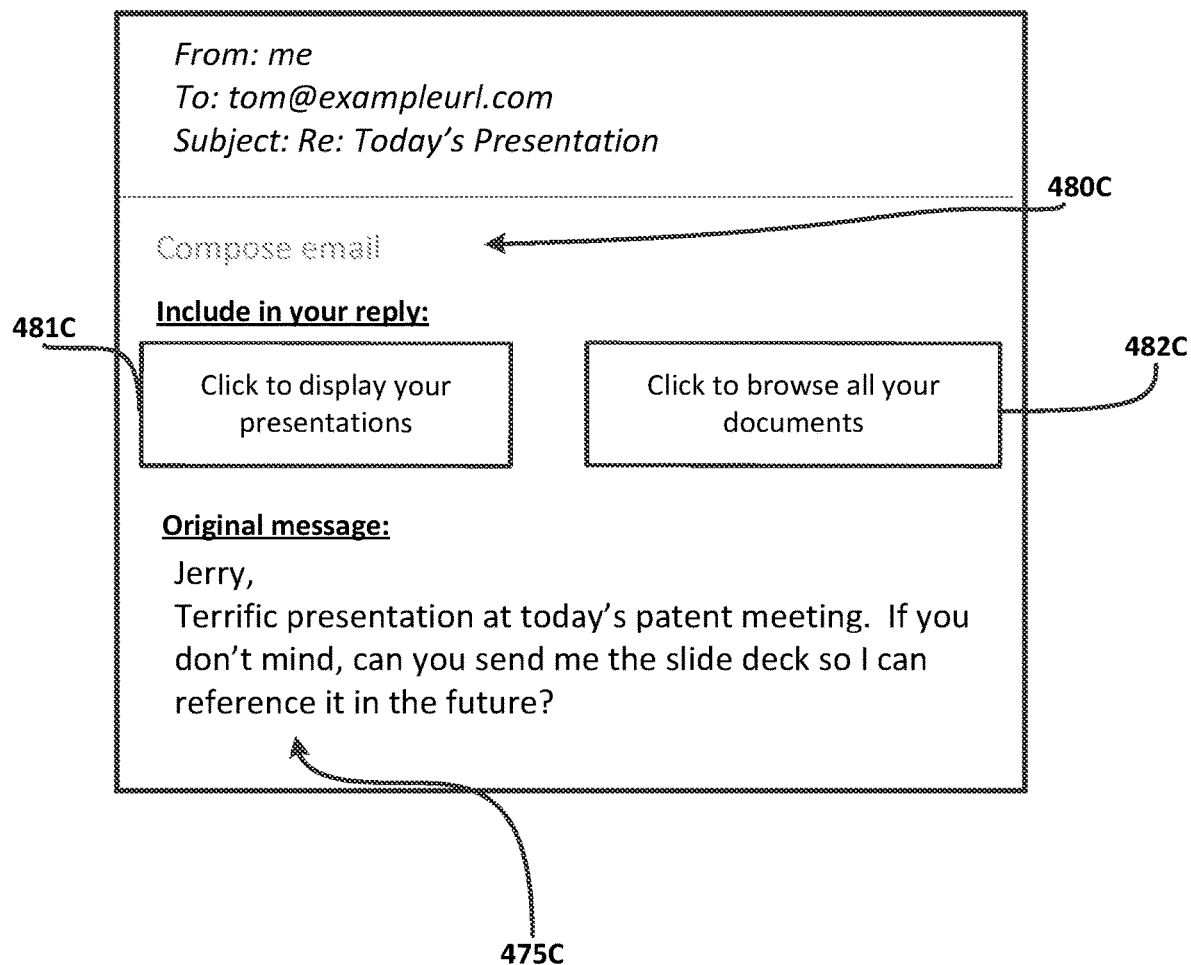

In FIG. 4C, a user has provided user interface input (e.g., selecting a "reply" graphical user interface element) to initiate a reply to an original email and is presented with a reply section 480C that includes phantom text "Compose email" indicating to the user that the user can compose a reply in the reply section 480C. The original email 475C to which the reply is responsive is also illustrated in FIG. 4C for reference of the user in generating the reply.

Graphical user interface element 481C is presented and is associated with multiple candidate electronic documents determined based on the original email 475C. For example, graphical user interface element 481C may be associated with all electronic presentations of the user composing the reply. The electronic presentations may have been identified based on issuing a search of the user's documents using a "presentation" search parameter that is based on the original email 475C. User selection of graphical user interface element 481C may present the user with graphical indications of the electronic presentations of the user, one or more of which may be selected to attach the selected electronic presentation(s) to the reply or incorporate link(s) to the electronic presentation(s) in the reply (e.g., a hyperlink incorporated in the reply section 480C).

Graphical user interface element 482C is associated with all of the user's electronic documents. User selection of graphical user interface element 482C may present the user with graphical indications of all of the electronic documents of the user. The user may browse all of the electronic documents and select one or more to attach to the reply or incorporate link(s) to the electronic document(s) in the reply (e.g., a hyperlink incorporated in the reply section 480C). Graphical user interface elements 481C and 482C are presented in FIG. 4C before the user has provided any textual input or other content for the reply.

In FIG. 4D1, a user has provided user interface input (e.g., selecting a "reply" graphical user interface element) to initiate a reply to an original email and is presented with a reply section 480D that includes phantom text "Compose email" indicating to the user that the user can compose a reply in the reply section 480D. The original email 475D to which the reply is responsive is also illustrated in FIG. 4D1 for reference of the user in generating the reply. In FIG. 4D1, an attachment graphical user interface element 477D is also presented. In response to user interface input that selects the attachment graphical user interface element 477D, the attachments graphical user interface of FIG. 4D2 is presented.

The attachments graphical user interface of FIG. 4D2 includes graphical user interface elements 481D and 482D for inclusion in the reply of associated candidate electronic documents determined based on the original email 475D. The graphical user interface elements 481D and 482D are presented in response to the selection of attachment graphical user interface element 477D and are presented before the user has provided any textual input or other content for the reply. User selection of graphical user interface element 481D may attach the electronic document "Patent Presentation.pdf" to the reply or incorporate a link to that electronic document in the reply (e.g., a hyperlink incorporated in the reply section 480D). Likewise, a user selection of graphical user interface element 482D may attach the electronic document "Budget Presentation.pdf" to the reply or incorporate a link to that electronic document in the reply. In some implementations, both graphical user interface elements 481D and 482D may be selected to include both associated electronic documents in the reply.

Graphical user interface elements 481D and 482D both include a title of the associated electronic document (presented in bold and underlined), along with associated additional information to facilitate user recollection of the associated electronic document. In some implementations, the presentation position of graphical user interface elements 481D and 482D may be based on determined display prominences that are based on rankings of the documents associated with those graphical user interface elements 481D and 482D. For example, graphical user interface element 481D may be presented positionally to the left of graphical user interface element 482D based on the document associated with graphical user interface element 481D being ranked higher than the document associated with graphical user interface element 482D. As described herein, the rankings of the documents may be rankings from a search issued with search parameters based on one or more message features of the original email.

The attachments graphical user interface of FIG. 4D2 also includes graphical user interface element 483D that, when selected via user interface input provided by the user, displays additional documents determined based on the original email 475D (e.g., based on issuing a search with search parameters based on one or more message features of the original email), but having a lower ranking than the documents associated with graphical user interface elements 481D and 482D. The attachments graphical user interface of FIG. 4D2 also includes graphical user interface element 484D that, when selected via user interface input provided by the user, enables the user to browser all of the user's electronic documents and select one or more to attach to the reply or incorporate link(s) to the electronic document(s) in the reply.

Figure 4E:
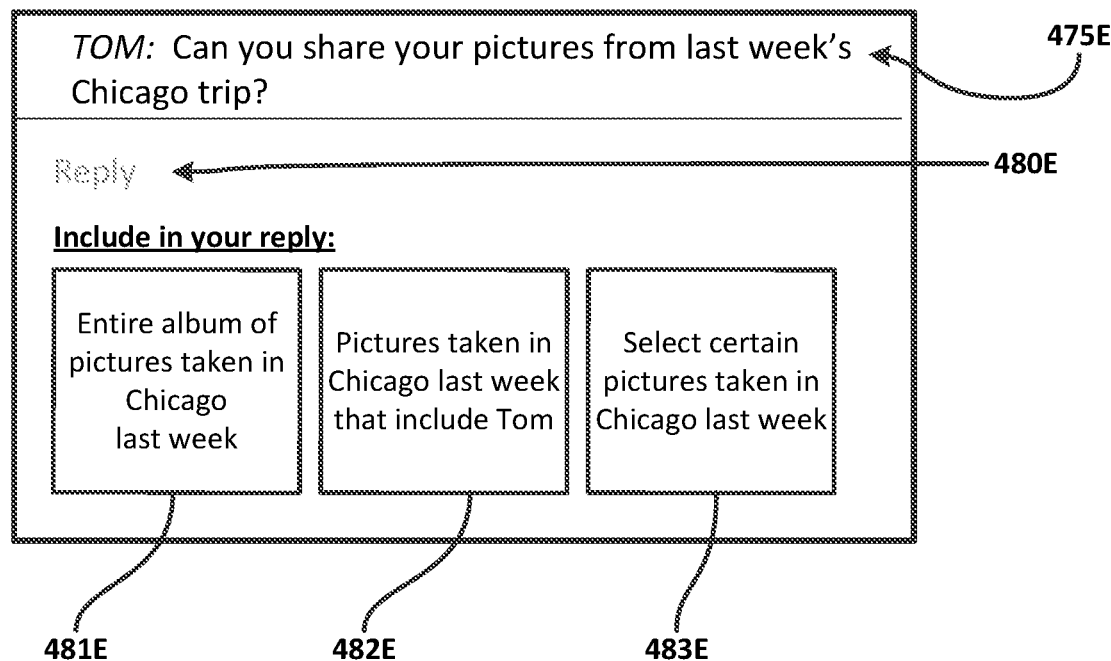

In FIG. 4E, a user has provided user interface input (e.g., selecting a "reply" graphical user interface element) to initiate a reply to an original text message and is presented with a reply section 480E that includes phantom text "Reply" indicating to the user that the user can compose a reply in the reply section 480E. The original text message 475E to which the reply is responsive is also illustrated in FIG. 4E for reference of the user in generating the reply.

Graphical user interface element 481E is presented and is associated with a first set of multiple candidate electronic documents determined based on the original email 475E. In particular, graphical user interface element 481E is associated with all pictures of the user composing the reply that were taken "last week" in "Chicago" and may be identified based on issuing a search of the user's documents using "images", "Chicago", and "last week" search parameters that are based on the original text message 475E. User selection of graphical user interface element 481E may attach those pictures to the reply or incorporate link(s) to the pictures in the reply (e.g., a hyperlink incorporated in the reply section 480E).

Graphical user interface element 482E is presented and is associated with a second set of multiple candidate electronic documents determined based on the original text message 475E. In particular, graphical user interface element 482E is associated with all pictures of the user composing the reply that were taken "last week" in "Chicago" that include "Tom" in the picture and may be identified based on issuing a search of the user's documents using "images", "Chicago", "last week", and "Tom" (e.g., a user identifier associated with Tom) search parameters that are based on the original text message 475E. User selection of graphical user interface element 482E may attach those pictures to the reply or incorporate link(s) to the pictures in the reply (e.g., a hyperlink incorporated in the reply section 480E).

Graphical user interface element 483E is also presented and is associated with the same first set of pictures as graphical user interface element 481E. However, user selection of graphical user interface element 483E may present the user with graphical indications of the pictures, one or more of which may be selected to attach the selected picture(s) to the reply or incorporate link(s) to the picture(s) in the reply (e.g., a hyperlink incorporated in the reply section 480E).

Figure 5:
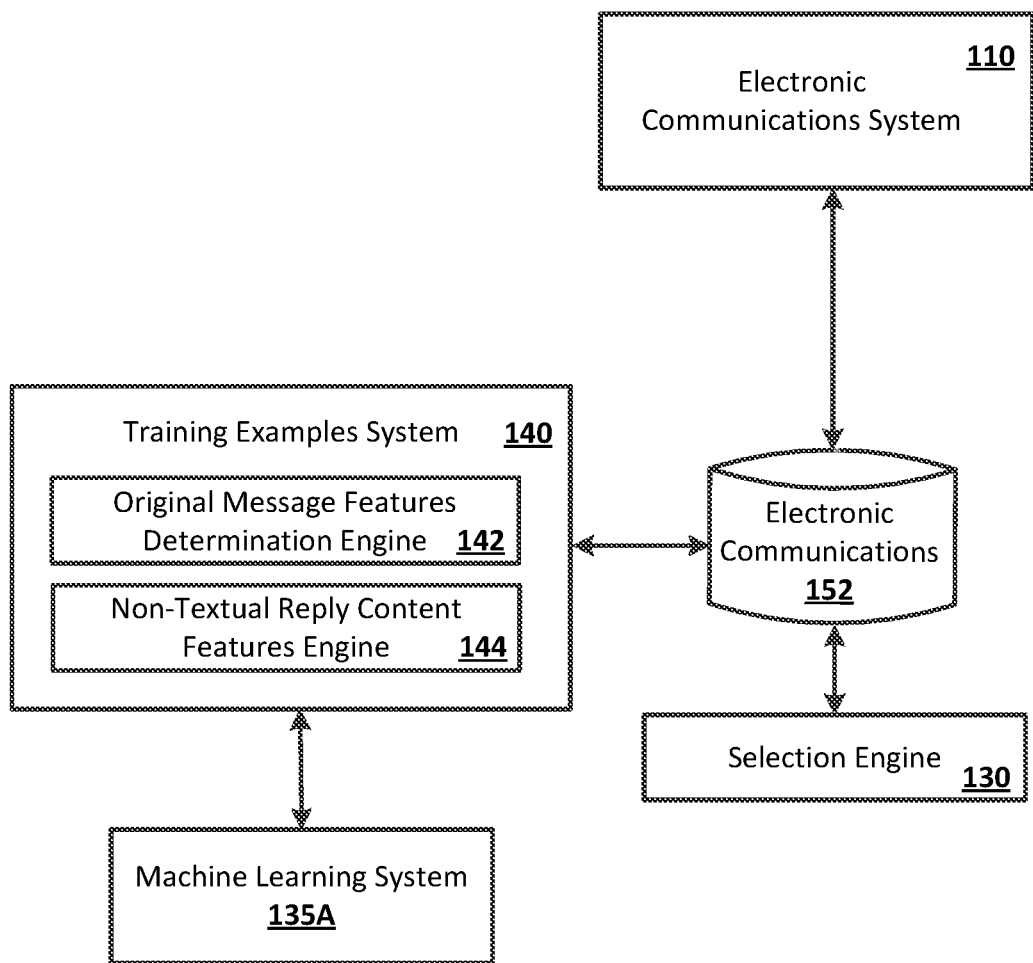
FIG. 5 illustrates an example environment in which electronic communications may be analyzed to generate training examples for training a machine learning system to determine one or more non-textual reply content features, and in which the machine learning system may be trained based on the training examples.
Figure 6:
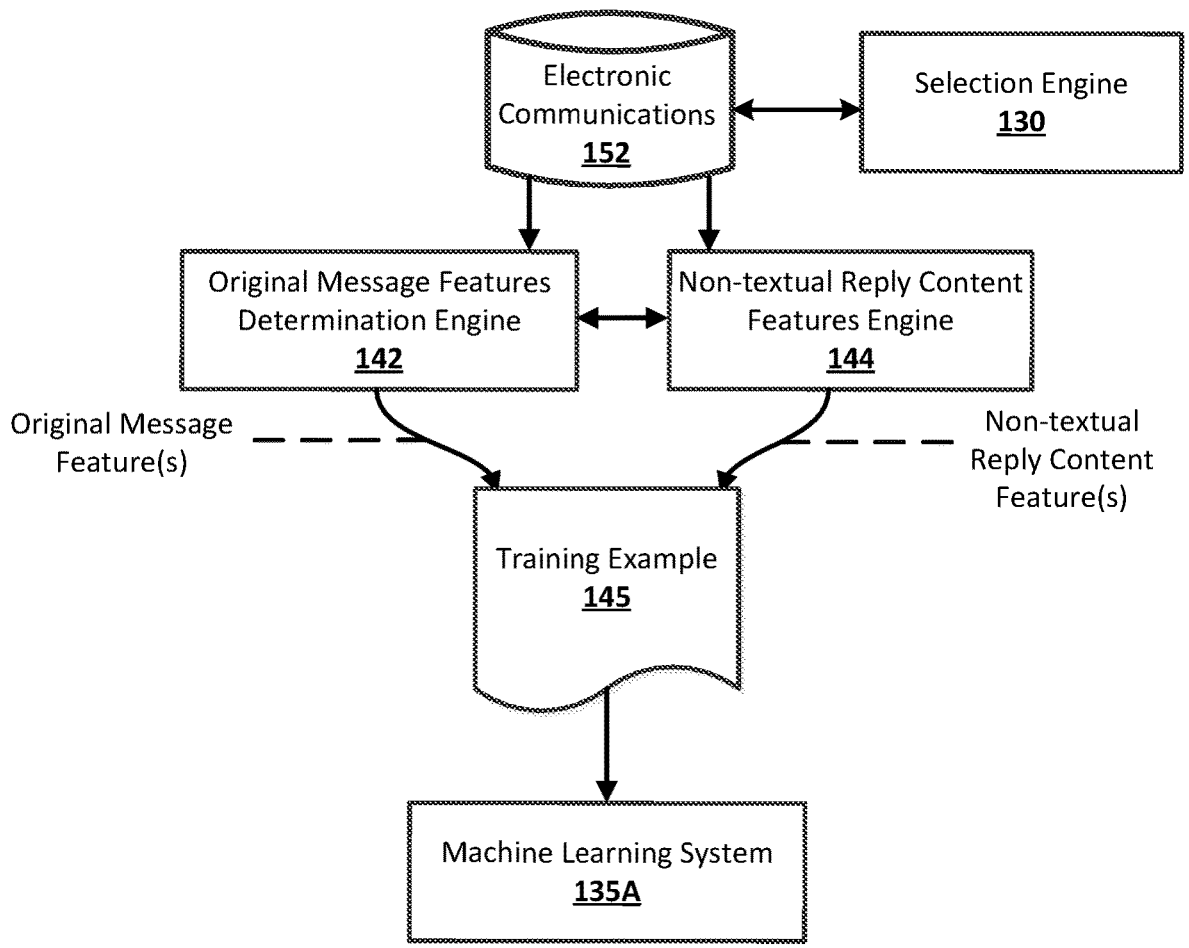
FIG. 6 illustrates an example of how training examples may be generated based on electronic communications and used to train a machine learning system to determine one or more non-textual reply content features.
Figure 7:
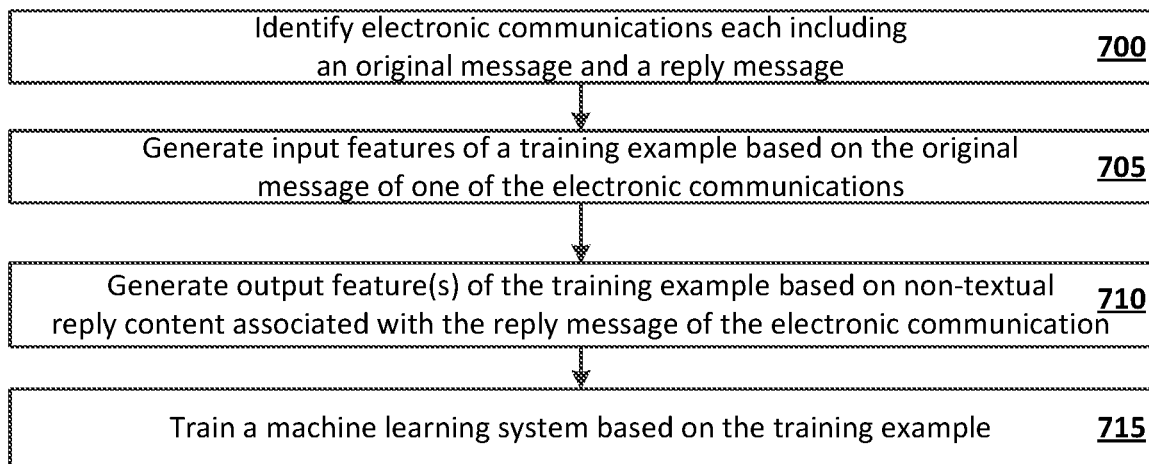
FIG. 7 is a flow chart illustrating an example method of generating training examples and using the training examples to train a machine learning system to determine one or more non-textual reply content features.

Turning now to FIGS. 5-7, additional description is provided of training the at least one trained machine learning system 135 of FIGS. 1 and 2 that may be utilized, for example, in various apparatus and methods described with respect to FIGS. 1-4.

FIG. 5 illustrates an example environment in which electronic communications may be analyzed to generate training examples for training a machine learning system to determine one or more non-textual reply content features and in which the machine learning system may be trained based on the training examples.

The example environment of FIG. 5 includes the electronic communications system 110, the electronic communications database 152, and a machine learning system 135A that represents the at least one trained machine learning system 135 of FIG. 1 in its untrained state. The example environment of FIG. 5 also includes a selection engine 130 and a training examples system 140.

Selection engine 130, training examples system 140, and machine learning system 135A may each be implemented in one or more computing devices that communicate, for example, through a network. Selection engine 130, training examples system 140, and machine learning system 135A are example systems in which the systems, components, and techniques described herein may be implemented and/or with which systems, components, and techniques described herein may interface. Selection engine 130, training examples system 140, and machine learning system 135A each include one or more memories for storage of data and software applications, one or more processors for accessing data and executing applications, and other components that facilitate communication over a network. In some implementations, selection engine 130 and training examples system 140 may include one or more components of the example computing device of FIG. 8. The operations performed by selection engine 130, training examples system 140, and/or machine learning system 135A may be distributed across multiple computer systems. In some implementations, one or more aspects of selection engine 130, training examples system 140, and/or machine learning system 135A may be combined in a single system.

Generally, in some implementations training examples system 140 utilizes, without direct human access, past electronic communications of electronic communications database 152 to generate training examples for training the machine learning system 135A. The training examples may be generated to train the machine learning system 135A to learn relationships between one or more message features of "original" messages and one or more features related to attachments in "replies" to those original messages. For example, in some implementations the machine learning system 135A may be trained to determine relationships between message features of original messages and a likelihood that replies to electronic communications having those message features include a document and/or a link to a document. Also, for example, in some other implementations, the machine learning system 135A may be trained to determine relationships between message features of original messages and document type(s) (e.g., images, videos, media, PDF, slides) of documents that will included or linked to in replies to electronic communications having those message features.

In some implementations, the selection engine 130 may select, based on one or more criteria, communications that are utilized by the training example system 140 to generate training examples for training each of one or more machine learning system 135. For example, the selection engine 130 may flag or otherwise annotate certain communications of the electronic communications database 152 as those that are appropriate for utilization by the training example system 140. In some implementations, the selection engine 130 may select the electronic communications that are utilized based on those electronic communications including an "original" message and a "reply" message that is responsive to the original message. As described herein, an electronic communication that includes an original message and a reply message may be a single document and/or multiple documents that are mapped to one another. In some implementations, the selection engine 130 may select the electronic communications that are utilized for training examples for training of the machine learning system 135A based on those electronic communications including a reply with non-textual reply content, such as an attached document and/or a link to a document.

In some implementations, the selection engine 130 may employ one or more techniques to reduce the occurrence of certain types of communications that are utilized in generating training examples. For example, where the database 152 includes emails, the selection engine 130 may employ techniques to filter out emails that are likely from businesses. For instance, emails from certain e-mail addresses, emails from email addresses with certain domain names, emails from email addresses with certain prefixes, emails with certain n-grams in a subject line, etc. may be filtered out. Also, for instance, emails that conform to certain business templates may be filtered out. Also, for instance, emails that are likely spam may be filtered out. In some implementations, the selection engine 130 selects electronic communications based on other attribute(s) associated with the communications and/or the sender(s) and/or recipient(s) of the communications. For example, if it is desirable to determine relationships between original message features and reply n-grams for a particular geographic region and/or domain, communications associated with that geographic region and/or domain may be selected.

In various implementations, training examples system 140 includes an original message features determination engine 142 and a non-textual reply content features engine 144. In some implementations, all or aspects of engines 142 and/or 144 may be omitted, combined, and/or implemented in a component that is separate from training examples system 140.

Generally, the original message features determination engine 142 and the non-textual reply content features engine 144 work in concert and determine a plurality of training examples, each based on a corresponding one of a plurality of electronic communications having an original message and a reply message. For a given electronic communication having an original message and a reply message, the original message features determination engine 142 determines a vector of original message features based on the original message of the given electronic communication, and the non-textual reply content features engine 144 determines a vector of one or more features of non-textual reply content based on the reply message of the given electronic communication.

The vector of original message features and the vector of one or more features of non-textual reply content that are included in the training examples will be dependent on the desired input parameters and desired output parameter(s) of the implementation of the machine learning system 135A. For example, assume the machine learning system 135A is being trained to provide, as output, a likelihood that a reply to an electronic communication will include a document and/or a link to a document. In such a situation the non-textual reply content features engine 144 may generate training examples that each include a vector of one or more non-textual reply content features that is a single feature that is either "true" (includes a document and/or a link to a document) or "false" (does not include a document and/or a link to a document). As another example, assume the machine learning system 135A is being trained to provide, as output: 1) a likelihood that a reply to an electronic communication includes a word processing document and/or a link to a word processing document; 2) a likelihood that a reply to an electronic communication includes a presentation and/or a link to a presentation; 3) a likelihood that a reply to an electronic communication includes an image and/or a link to an image; 4) a likelihood that a reply to an electronic communication includes a video and/or a link to a video; and 5) optionally likelihood(s) for additional and/or alternative document type(s). In such a situation the non-textual reply content features engine 144 may generate training examples that each include a vector of a plurality of reply content features that are each either "true" (includes a document of that type and/or a link to a document of that type) or "false" (does not include a document of that type and/or a link to a document of that type).

Various original message features may be determined by the original message features determination engine 142 such as syntactic, semantic, n-gram, and/or metadata based features. For example, one or more original message features may indicate whether a particular n-gram is present in one or more locations of an original message, or whether any n-gram of a particular class of n-grams is present in one or more locations of an original message. A class of n-grams may be, for example, a group of n-grams that have similar semantic meaning, such as a group of "requesting verbs" such as "provide", "send", "include", "can", "attach", etc. As another example, an original message feature may indicate a quantity of recipients of the original email, such as "one", "two to five", or "five or more."

As yet another example, an original message feature may indicate a semantic feature of one or more portions of an original message, such as a semantic feature of a subject of the original message, all or portions of the body of the original message, etc. In some implementations, the original message features determination engine 142 may determine one or more semantic features of an original message based on grouping electronic communications into a plurality of clusters, and determine the semantic features of the original message based on its cluster. In some of those implementations, the original message features determination engine 142 groups the electronic communications into a plurality of clusters based on similarities between the text of the original messages of the electronic communications of the corpus, such as semantic, syntactic, and/or textual similarities. Generally, the original messages of electronic communications that are grouped in a given cluster will be more similar to one another (based on the similarities utilized in the grouping) than to the original messages grouped in other clusters. Each of the determined clusters corresponds to a different semantic category of content of the original message. In some implementations, the original message features determination engine 142 may utilize one or more clustering techniques in grouping electronic communications into a plurality of clusters based on similarity measures between the original messages. For example, in some implementations x-means clustering may be utilized, with the distance between original messages being based on the similarity measures between the original messages. Generally, x-means clustering is an unsupervised method of finding the ideal k to use for k-means clustering. Generally, k-means clustering aims to partition observations into a plurality of groups, with each observation being included in a group with which it is most related. Additional and/or alternative clustering techniques may optionally be used.

The training examples generated by the training examples system 140 for the machine learning system 135A are provided to the machine learning system 135A to train the machine learning system 135A. During training, the machine learning system 135A iteratively learns a hierarchy of feature representations based on the training examples generated by the training examples system 140.

Turning now to FIG. 6, an example is illustrated of how training examples may be generated based on electronic communications and used to train a machine learning system to determine one or more non-textual reply content features. The selection engine 130 may select, based on one or more criteria, communications from electronic communications database 152 that are to be utilized to generate training examples for training the machine learning system 135A. For example, the selection engine 130 may flag or otherwise annotate certain communications of the electronic communications database 152 as those that are appropriate for utilization in generating training examples.

For each of a plurality of the electronic communications, the original message features determination engine 142 determines a vector of original message features based on the original message of the given electronic communication and includes the original message features as input parameters of a corresponding training example 145. The non-textual reply content features engine 144 determines a vector of one or more non-textual reply content features based on the reply message of the given electronic communication and includes the non-textual reply content features as output parameter(s) of the corresponding training example 145. The training example 145 is utilized to train the machine learning system 135A. Although only a single training example 145 is illustrated in FIG. 6, it is understood that the engines 142 and 144 will generate a plurality of training examples (each being based on a corresponding electronic communication) and the plurality of training examples utilized to train the machine learning system 135A.

As one specific implementation of FIG. 6, the training example 145 and all additional training examples may each have an output parameter indicative of type(s) of document(s) included in a reply message of a corresponding electronic communication and one or more input parameters based on the original message of the corresponding electronic communication. For instance, the non-textual reply content features engine 144 may generate, based on a reply message that includes an image as an attachment, non-textual reply content features for an output of a first training example that includes an indication of a document type of "image". The original message features determination engine 142 may generate, based on a corresponding original message, original message features as an input of the first training example. The original message features may include, for example, one or more syntactic, semantic, and/or n-gram based features of the original message. Also, for instance, the non-textual reply content features engine 144 may generate, based on a reply message that includes a "PDF" as an attachment, non-textual reply content features for an output of a second training example that includes an indication of a document type of "PDF". The original message features determination engine 142 may generate, based on a corresponding original message, original message features as an input of the second training example. The original message features may include, for example, one or more syntactic, semantic, and/or n-gram based features of the original message. Additional training examples may be similarly generated, including additional examples each having output features based on other type(s) of documents of a corresponding reply message of an additional electronic communication and input features based on a corresponding original message of the additional electronic communication. The machine learning system may be trained based on the training examples. The trained machine learning system may receive, as input, one or more message features of an original message and provide, as output, one or more types of documents and optionally associated likelihoods to be included in a reply to the original message. The trained machine learning system may be utilized, for example, to determine, for future electronic communications, one or more search parameters based on the type(s) of documents provided as output by the trained machine learning system and/or to restrict the corpus(es) of an issued search based on the type(s) of documents provided as output by the trained machine learning system.

As another specific implementation of FIG. 6, the training example 145 and all additional training examples may each have an output parameter indicative of likelihood a document is included in a reply message of a corresponding electronic communication and one or more input parameters based on the original message of the corresponding electronic communication. For instance, the non-textual reply content features engine 144 may generate, based on a reply message that includes an attached document and/or a link to a document, non-textual reply content features for an output of a first positive training example that includes an indication of "document included in reply". The original message features determination engine 142 may generate, based on a corresponding original message, original message features as an input of the first training example. The original message features may include, for example, one or more syntactic, semantic, and/or n-gram based features of the original message. Also, for instance, the non-textual reply content features engine 144 may generate, based on a reply message does not include document and/or a link to a document, non-textual reply content features for an output of a second negative training example that includes an indication of "document not included in reply". The original message features determination engine 142 may generate, based on a corresponding original message, original message features as an input of the second training example. The original message features may include, for example, one or more syntactic, semantic, and/or n-gram based features of the original message. Additional training examples may be similarly generated. The trained machine learning system may receive, as input, one or more features of an original message and provide, as output, a likelihood that a document will be included in a reply to the original message. The trained machine learning system may be utilized, for example, to determine, for future electronic communications, whether and/or how attachments are provided for inclusion in a reply to those electronic communications (e.g., a low likelihood that a reply will include an attachment may lead to no attachments being provided, or the attachments being "suggested" in a less conspicuous manner).

FIG. 7 is a flow chart illustrating an example method of generating training examples and using the training examples to train a machine learning system to determine one or more non-textual reply content features. For convenience, the operations of the flow chart are described with reference to a system that performs the operations. This system may include various components of various computer systems. For instance, some operations may be performed by one or more components of the training example system 140 and/or the machine learning system 135A of FIG. 5. Moreover, while operations of the method of FIG. 7 are shown in a particular order, this is not meant to be limiting. One or more operations may be reordered, omitted or added.

At block 700, the system identifies electronic communications. Each of the electronic communications includes an original message and a reply message.

At block 705, the system generates input features of a training example based on the original message of one of the electronic communications. Various original message features may be determined by the system such as syntactic, semantic, n-gram, and/or metadata based features.

At block 710, the system generates output feature(s) of the training example based on non-textual reply content associated with the reply message of the electronic communication. For example, in one implementation the output feature(s) may be either "true" or "false" and will be true if the reply message includes a document and/or link to a document, and false otherwise. Also, for example, in another implementation the output feature(s) may be include multiple features that are each either "true" or "false", and that are each indicative of whether the reply message includes a document of a corresponding file type that indicates a closed class of one or more filename extensions. For instance, a first feature may indicate "images" that indicates a closed class of images (e.g., .jpg, .png, .gif), a second feature may indicate "presentations" that indicates a closed class of presentations (e.g., .pdf, .ppt), etc.

At block 715, the system trains a machine learning system based on the training example.

Although the method of FIG. 7 is described with respect to a single training example, it is understood that one or more of the steps (e.g., blocks 705, 710, and 715) may be performed iteratively to determine multiple training examples and train the machine learning system based on the multiple training examples.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 8:
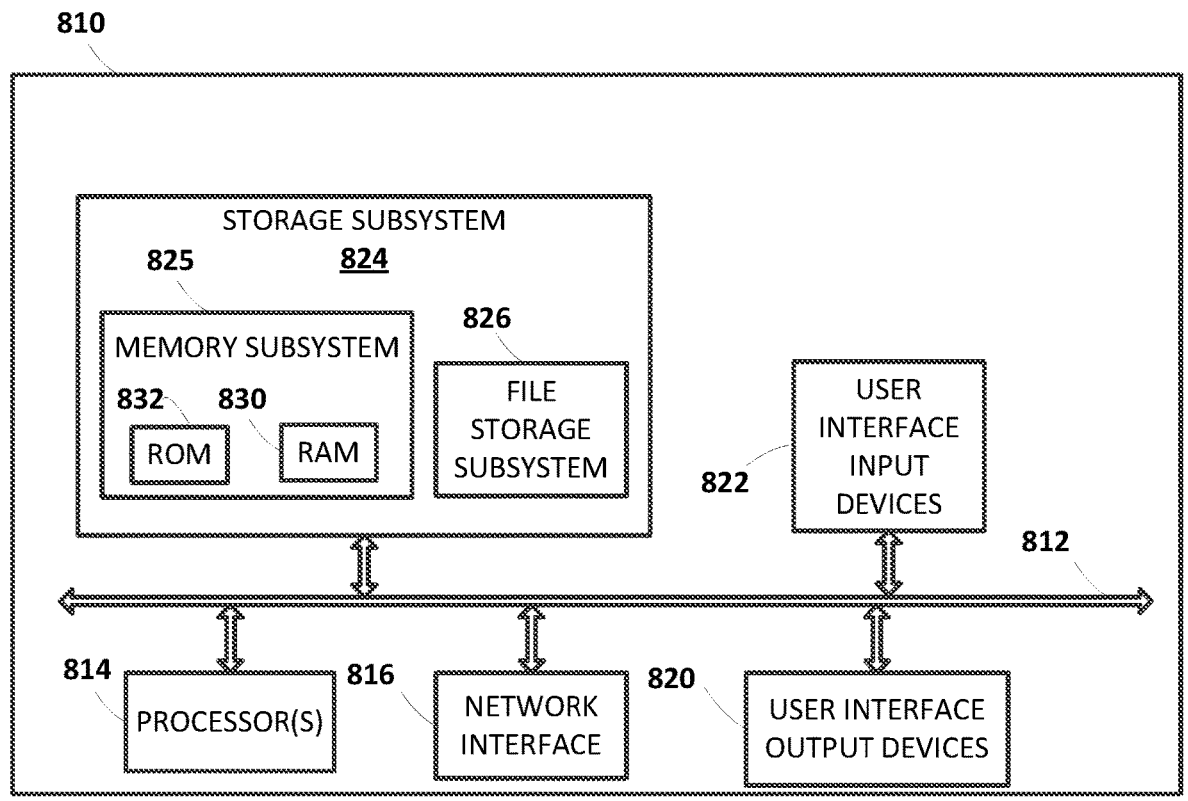
FIG. 8 illustrates an example architecture of a computing device.

FIG. 8 is a block diagram of an example computing device 810. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIG. 3 and/or FIG. 7.

These software modules are generally executed by processor 817 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 827, or in other machines accessible by the processor(s) 817.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    identifying, from an electronic communication sent by a sending user to a recipient user:
        a sender identifier of the sending user, and
        a communication feature determined based on an n-gram from a subject or a body of the electronic communication;
    issuing a search, of one or more corpuses of electronic documents, using, as search parameters for the search:
        both the sender identifier and the communication feature;
    selecting one or more electronic documents based on the electronic documents being responsive to the search that is based on both the sender identifier and the communication feature;
    causing a selectable attachment graphical element, associated with the one or more electronic documents, to be presented, at a client device of the user, along with presentation of the electronic communication and before the user has provided any content for replying to the electronic communication; and
    responsive to a selection, at the client device, of the selectable attachment graphical element while it is presented:
        automatically attaching the one or more electronic documents to a reply electronic communication that is a reply to the electronic communication, and/or
        automatically incorporating a link to the one or more electronic documents into the reply electronic communication.

2. The method of claim 1, wherein the one or more electronic documents are one or more images.

3. The method of claim 2, wherein the one or more images each include the sending user and are each related to the communication feature.

4. The method of claim 3, wherein the communication feature is a geographic location feature.

5. The method of claim 4, wherein the n-gram, based on which the search parameter is determined, is from the body of the electronic communication sent to the user.

6. The method of claim 1, wherein the one or more corpuses include only one or more corpuses that are accessible only to the user and to one or more additional users or systems authorized by the user.

7. The method of claim 6, further comprising:
    determining a likelihood that the electronic communication will be replied to with non-textual reply content;
    wherein causing the selectable attachment graphical element to be presented is in response to the likelihood satisfying a threshold.

8. The method of claim 1, wherein automatically attaching the one or more electronic documents to the reply electronic communication occurs responsive to the selection of the selectable attachment graphical element while it is presented.

9. The method of claim 1, wherein automatically incorporating the link to the one or more electronic documents into the reply electronic communication occurs responsive to the selection of the selectable attachment graphical element while it is presented.

10. The method of claim 1, further comprising:
    determining a likelihood that the electronic communication will be replied to with non-textual reply content;
    wherein causing the selectable attachment graphical element to be presented is in response to the likelihood satisfying a threshold.

11. The method of claim 1, wherein selecting the one or more electronic documents comprises selecting the one or more electronic documents based on corresponding rankings of the one or more electronic documents.

12. A system, comprising:
    one or more non-transitory computer readable media storing an electronic communication sent to a user by a sending user;
    at least one processor; and
    memory coupled to the processor, wherein the memory stores instructions to be executed by the processor to perform steps comprising:
        identifying, from the electronic communication sent:
            a sender identifier of the sending user, and
            a communication feature determined based on an n-gram from a subject or a body of the electronic communication;
        issuing a search, of one or more corpuses of electronic documents, using, as search parameters for the search:
            both the sender identifier and the communication feature;
        selecting one or more electronic documents based on the electronic documents being responsive to the search that is based on both the sender identifier and the communication feature;
        causing a selectable attachment graphical element, associated with the one or more electronic documents, to be presented, at a client device of the user, along with presentation of the electronic communication and before the user has provided any content for replying to the electronic communication; and responsive to a selection, at the client device, of the selectable attachment graphical element while it is presented:

automatically attaching the one or more electronic documents to a reply electronic communication that is a reply to the electronic communication, and/or automatically incorporating a link to the one or more electronic documents into the reply electronic communication.

13. The system of claim 12, wherein the one or more electronic documents are one or more images.

14. The system of claim 13, wherein the one or more images each include the sending user and are each related to the communication feature.

15. The system of claim 14, wherein the communication feature is a geographic location feature.

16. The system of claim 12, wherein the one or more corpuses include only one or more corpuses that are accessible only to the user and to one or more additional users or systems authorized by the user.

17. The system of claim 16, wherein the steps further comprise:

determining a likelihood that the electronic communication will be replied to with non-textual reply content;

wherein causing the selectable attachment graphical element to be presented is in response to the likelihood satisfying a threshold.

18. The system of claim 12, wherein automatically attaching the one or more electronic documents to the reply electronic communication occurs responsive to the selection of the selectable attachment graphical element while it is presented.

19. The system of claim 12, wherein automatically incorporating the link to the one or more electronic documents into the reply electronic communication occurs responsive to the selection of the selectable attachment graphical element while it is presented.

20. The system of claim 12, wherein the steps further comprise:

determining a likelihood that the electronic communication will be replied to with non-textual reply content;

wherein causing the selectable attachment graphical element to be presented is in response to the likelihood satisfying a threshold.

* * * * *